United States Patent
Rajbhandari et al.

(10) Patent No.: US 9,690,838 B2
(45) Date of Patent: Jun. 27, 2017

(54) MASTER DATA MANAGEMENT

(71) Applicant: Microsoft Technology Licensing, LLC, Redmond, WA (US)

(72) Inventors: Bigyan Rajbhandari, Redmond, WA (US); Duc T. Luong, Seattle, WA (US); Kiky W. Tangerine, Bellevue, WA (US); Zhonghua Chu, Redmond, WA (US); Ramakanthachary S. Gottumukkala, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

(21) Appl. No.: 14/189,384

(22) Filed: Feb. 25, 2014

(65) Prior Publication Data

US 2015/0120651 A1 Apr. 30, 2015

Related U.S. Application Data

(60) Provisional application No. 61/897,935, filed on Oct. 31, 2013.

(51) Int. Cl.
  *G06F 17/30* (2006.01)
  *H04L 29/08* (2006.01)

(52) U.S. Cl.
  CPC .... *G06F 17/30575* (2013.01); *H04L 67/1095* (2013.01)

(58) Field of Classification Search
  CPC ................................................ G06F 17/30575
  USPC ................................................ 707/610, 609
  See application file for complete search history.

(56) References Cited

U.S. PATENT DOCUMENTS

| | | | | |
|---|---|---|---|---|
| 6,000,000 A * | 12/1999 | Hawkins | ........... | G06F 17/30286 707/610 |
| 6,275,831 B1 * | 8/2001 | Bodnar | ............. | G06F 17/30575 |
| 7,487,135 B2 * | 2/2009 | Pivowar | ............ | G06F 17/30578 |
| 7,577,907 B2 * | 8/2009 | Vishnia-Shabtai | ....... | G06F 8/38 715/255 |
| 7,720,811 B2 * | 5/2010 | Hicks | ................ | G06F 17/30575 707/614 |
| 8,019,737 B2 * | 9/2011 | Kocsis | ............. | G06F 17/30297 707/616 |
| 8,027,953 B2 * | 9/2011 | Larue | ................ | G06F 17/30578 707/612 |
| 8,463,755 B2 | 6/2013 | Kretschmer et al. | | |

(Continued)

OTHER PUBLICATIONS

Butler, David, "Master Data Management and Cloud Computing", Published on: Mar. 17, 2011, Available at: https://blogs.oracle.com/mdm/entry/master_data_management_and_cloud_computing.

(Continued)

*Primary Examiner* — Miranda Le
(74) *Attorney, Agent, or Firm* — Christopher J. Volkmann; Kelly, Holt & Christenson, PLLC

(57) ABSTRACT

Multiple instances of a computer system subscribe to a central data storage system. The central data storage system receives a set of entities that the instances wish to synchronize with one another, along with a schema representing those entities, from each instance. The central data storage system receives changes to the identified entities from the various instances, identifies conflicts, and synchronizes changes from a given instance to the other subscribing instances.

15 Claims, 23 Drawing Sheets

(56) References Cited

U.S. PATENT DOCUMENTS

| | | | | |
|---|---|---|---|---|
| 8,473,782 B2* | 6/2013 | Park | G06F 11/1474 | |
| | | | 714/15 | |
| 8,589,574 B1* | 11/2013 | Cormie | G06F 17/30094 | |
| | | | 709/230 | |
| 8,635,373 B1* | 1/2014 | Supramaniam | H04L 67/42 | |
| | | | 709/228 | |
| 9,298,794 B2* | 3/2016 | Smith | G06F 17/30578 | |
| 9,311,378 B2* | 4/2016 | Subramanian | G06F 17/30578 | |
| 2003/0177408 A1* | 9/2003 | Fields | G06Q 10/10 | |
| | | | 713/400 | |
| 2008/0046437 A1* | 2/2008 | Wood | G06F 17/30578 | |
| 2011/0040863 A1* | 2/2011 | Griffin | H04L 67/1095 | |
| | | | 709/223 | |
| 2011/0119233 A1 | 5/2011 | Reddy | | |
| 2012/0198036 A1 | 8/2012 | Korovin et al. | | |
| 2012/0233122 A1* | 9/2012 | Briet | H04L 67/1095 | |
| | | | 707/634 | |
| 2012/0303673 A1 | 11/2012 | Anand et al. | | |
| 2013/0006929 A1* | 1/2013 | McCarthy | G06F 17/30165 | |
| | | | 707/622 | |
| 2013/0060825 A1 | 3/2013 | Farcasiu et al. | | |
| 2014/0040197 A1* | 2/2014 | Wijayaratne | G06F 17/3007 | |
| | | | 707/625 | |
| 2014/0279871 A1* | 9/2014 | Ochoa | G06F 17/30578 | |
| | | | 707/610 | |
| 2014/0280882 A1* | 9/2014 | LaCerte | G06F 19/3418 | |
| | | | 709/224 | |
| 2016/0127465 A1* | 5/2016 | Barstow | H04L 67/1095 | |
| | | | 707/620 | |

OTHER PUBLICATIONS

Vitt, Elizabeth, "Data Integration Solutions for Master Data Management", Published on: Mar. 2006, Available at: http://technet.microsoft.com/en-usilibrary/aa964123(v=sql.90).aspx.

Anikiiev, Alex, "Inside Microsoft Dynamics AX 2012 Master Data Management Scenario", Published on: Jul. 16, 2013, Available at: http://community.dynamics.com/ax/b/microsoftdynamicsaxintegration/archive/2013/07/16/inside-microsoft-dynamics-ax-2012-master-data-management-scenario.aspx.

Wolter, Roger, "Master Data Management (MDM) Hub Architecture", Published on: Apr. 2007, Available at: http://msdn.microsoft.com/en-us/library/bb410798.aspx.

* cited by examiner

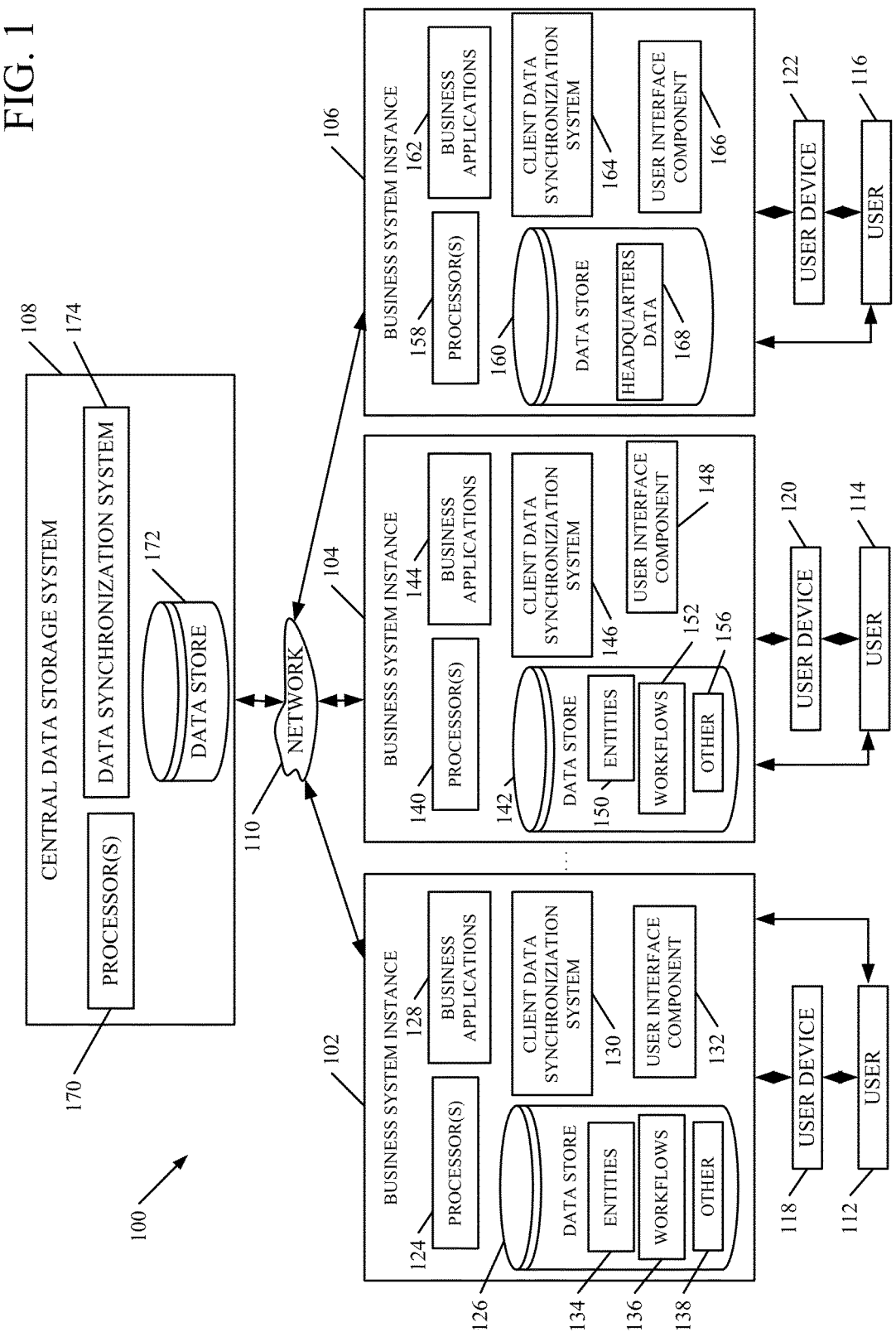

MASTER DATA MANAGEMENT

The present application is based on and claims the benefit of U.S. provisional patent application Ser. No. 61/897,935, filed Oct. 31, 2013, the content of which is hereby incorporated by reference in its entirety.

BACKGROUND

Many different kinds of computer systems are currently in wide use. In some environments, different instances of a given computer system are deployed at different locations of a given organization. In some such systems, attempts have been made to keep certain items of data synchronized across the various deployed instances.

By way of example, some such computer systems include business systems. Business systems can include, for instance, enterprise resource planning (ERP) systems, customer relations management (CRM) systems, line-of-business (LOB) systems, among others. Such business systems can store business data records in the form of entities. By way of example, a customer entity may represent different aspects of a customer (such as the customer's name, account number, address, etc.). A vendor entity may represent a vendor. A product entity may represent one or more products. A proposal entity may represent a business proposal. A quote entity may represent a quote, and an opportunity entity may represent a business opportunity, etc. These are only a few examples of the different types that are represented by entities in various business systems.

Also, in such business systems, the entities may include information from different data structures in a database. For instance, a single entity may represent information that is extracted from one or more different physical tables in a data store.

Some organizations wish to keep certain items of data synchronized, across all of the various instances that deploy the business system. For instance, it may be that a user organization has different physical locations, each running an instance of the business system. Yet, the organization may wish to maintain information represented by the customer entity in sync, across all the various instances.

Currently, synchronizing data among various instances of a computer system is often done using data replication. Data replication is often performed on the physical table level. That is, the user organization specifies the underlying tables that are to be synchronized, and data in those tables is simply replicated from one instance of the business system to the others. This is often a very tedious process which requires a great deal of customization to the business system. Because each of the instances of the business system may be set up or configured slightly differently, a great deal of effort is needed in order to insure that table-level replication is accurate.

The discussion above is merely provided for general background information and is not intended to be used as an aid in determining the scope of the claimed subject matter.

SUMMARY

Multiple instances of a computer system subscribe to a central data storage system. The central data storage system receives a set of entities that the instances wish to synchronize with one another, along with a schema representing those entities, from each instance. The central data storage system receives changes to the identified entities from the various instances, identifies conflicts, and synchronizes changes from a given instance to the other subscribing instances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1 is a block diagram of one illustrative business system architecture.

FIGS. 2 and 2-1 (collectively FIG. 2) show a portion of the architecture shown in FIG. 1, illustrating the data synchronization systems in more detail.

DETAILED DESCRIPTION

Figure 2:
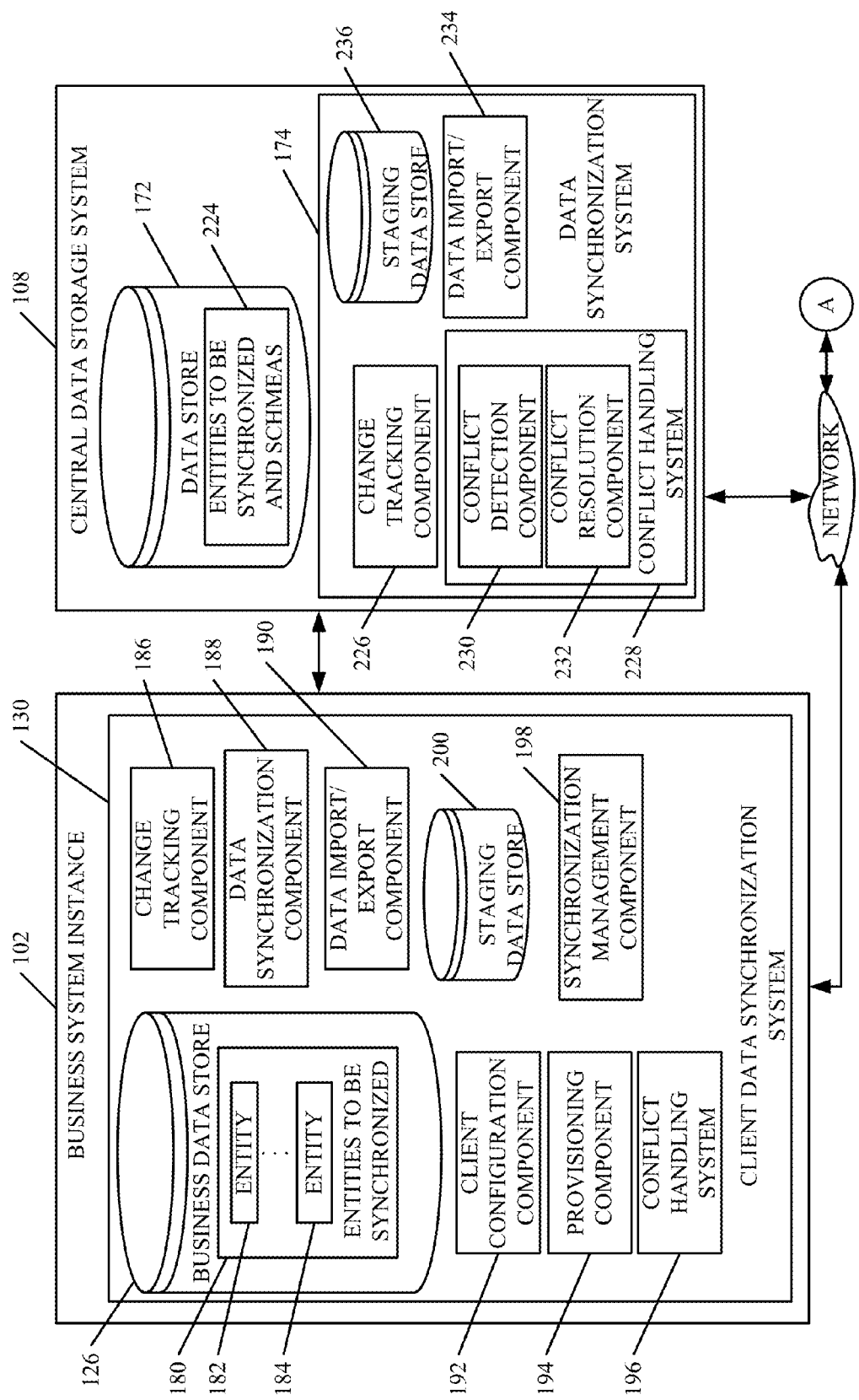
Figures 1, 2:
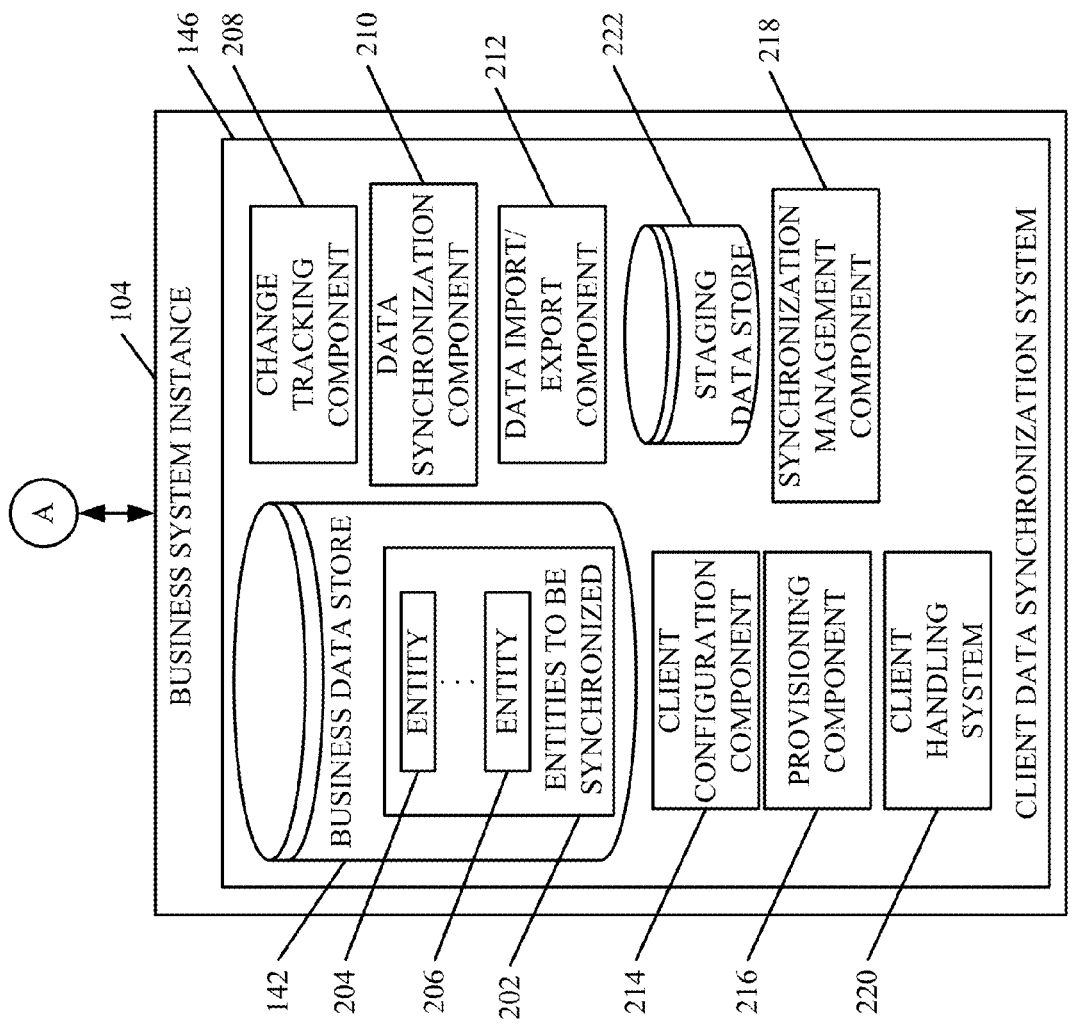

FIG. 1 is a block diagram of one embodiment of an overall business system architecture 100. Architecture 100 includes a plurality of business system instances 102 and 104, which can be geographically remote from one another. FIG. 1 also shows a business system headquarters instance 106 which can be one of the business system instances 102 or 104, or a different instance altogether. FIG. 1 shows that instances 102-106 all have access to a central data storage system 108. Access can either be direct, or over network 110. For purposes of the present discussion, the description will proceed with respect to instances 102-106 accessing system 108 over network 110. Network 110 can be a local area network, a wide area network, etc. Also, as is described in greater detail below, architecture 100 can be deployed in a cloud computing architecture as well.

FIG. 1 also shows that a plurality of different users 112, 114 and 116 have access to the different instances 102-106 of the business system. The users 112-116 can access the business systems directly, or through respective user devices 118, 120 and 122. In the embodiment shown in FIG. 1, business system instances 102-106 are different instances of a business system, such as a CRM system, an ERP system, an LOB system, or another business system.

FIG. 1 shows that business system instance 102 includes processor 124, business data store 126, business applications 128, client data synchronization system 130 and user interface component 132. It may also of course include other items or components as well. Business data store 126 illustratively stores business data, such as entities 134, work flows 136 and other information 138. In one embodiment, business applications 128 access the data and work flows and other information in business data store 126 and generate user interface displays for user 112 to perform tasks, activities, or other operations in order to conduct the business of the organization deploying instance 102. For instance, business applications 128 may include a general ledger application, other accounting applications, applications for developing and tracking business opportunities, inventory applications, shipping applications, or other applications.

Business system instance 104 illustratively includes processor 140, business data store 142, business applications 144, client data synchronization system 146 and user interface component 148. Business system data store 142 also illustratively stores data such as entities 150, work flows 152 and other information 156. The items in business system instance 104 can be similar to those described with respect to business system instance 102, or they can be different.

FIG. 1 shows that business system instance 106 includes processor 158, business data store 160, business applications 162, client data synchronization system 164, and user interface component 166. The business data store 160 illustratively includes headquarters data 168, which may be similar to the data stored in instances 102 and 104, or it may be different, or it may include additional information.

In one embodiment, each of the instances 102-106 operate on data which the organization deploying the instances wishes to be kept in synchronization among the various instances. By way of example, that data may include master data, such as data that represents customers and products, but it may also include specialized data sets, such as general ledger accounts or other data. The master data may illustratively be data that changes relatively slowly and that identifies things, within the business, such as people, things, places and concepts. It may also be data that can be contributed to (or changed) by multiple stakeholders within architecture 100, and that is accessed by multiple different stakeholders. Examples of such master data can include a customer entity, a vendor entity, a product entity, an employee entity, and various general ledger accounts. Of course, the master data can be substantially any data that is represented by an abstract entity, and which the organization deploying the business instances wishes to be kept in sync, among the various instances. Those described above are described for the sake of example only.

It should also be noted that it may be information that the organization wishes to synchronize across instances of different business systems. For instance, the organization deploying the business systems may wish to synchronize customer and vendor information across a customer relations management system and an enterprise resource planning system. It may also wish to synchronize employee information across a payroll system, an enterprise resource planning system, and a human resources personnel directory. The organization may wish to synchronize product and pricing information across operation pricing tools (such as pricing engines), the enterprise resource planning system and vendor systems deployed within the organization. It may also, of course, wish to synchronize information across different instances of the same business system, which are deployed in geographically or divisionally separate locations. Therefore, while the present discussion will proceed with respect to business instances 102-106 being different instances of the same business system, it will be appreciated that they could be instances of different business systems deployed by the same organization, where data synchronization of various entities is desired by the organization deploying the instances.

In any case, instances 102-106 all illustratively have access to central data storage system 108. FIG. 1 shows that system 108 illustratively includes one or more processors (or servers) 170, one or more data stores 172, and data synchronization system 174.

While a more detailed discussion of the data synchronization setup and operational processes are described below with respect to the remaining figures, a brief overview is provided here, for the sake of enhanced understanding. Each of the client data synchronization systems 130, 146 and 164 illustratively provide functionality for allowing instances 102-106, respectively, to connect to a given central data storage system 108, for synchronization. They also illustratively allow instances 102-106 to identify various entities, or groups of entities, that the instances wish to be kept in synchronization across the various instances. Systems 130, 146 and 164 illustratively include change tracking components that identify when a given user has made a change to one of the entities that are to be kept in sync. The client data synchronization systems intermittently connect to central data storage system 108 and upload the changes to those entities. Data synchronization system 174 in central data storage system 108 illustratively receives those changes and identifies which other instances the changes need to be synchronized with. It also illustratively identifies conflicts that need to be resolved. When any of the instances 102-106 either connect with system 108 to upload changes to it, or to look for changes that need to be synchronized to that given instance, data synchronization system 174 in system 108 prepares any synchronization data that needs to be downloaded to the given instance. The client data synchronization system in the given instance downloads the synchronization data from central data storage system 108 and synchronizes it to its own business data store, again identifying conflicts that need to be resolved.

It will be noted that the synchronization is performed on the entity level. Therefore, synchronization data may be generated from multiple different tables in the business system data stores of the instances (for each entity), and synchronization data that is received from another instance (through central data storage system 108) may be written to multiple different tables within the business system data store of a receiving instance. However, because the data to be synchronized is simply identified at the entity level, it is much easier for a user to identify information to be synchronized and to manually resolve conflicts, where that is needed.

FIGS. 2 and 2-1 (collectively FIG. 2) shows §a block diagram showing business system instances 102 and 104, as well as central data storage system 108. It can be seen that FIG. 2 omits some items from instances 102 and 104 and from system 108, but shows the client data synchronization systems 130 and 146, as well as the data synchronization system 174 on system 108, in greater detail. It will also be noted that, while the description proceeds with respect to synchronization of data between business system instance 102 and business system instance 104, the same operations can be performed with respect to either of those instances and business system instance 106, or other instances. Synchronization between instances 102 and 104 is described for the sake of example only.

FIG. 2 shows that business data store 126 in instance 102, includes a set 180 of entities to be synchronized with instance 104. The entities are identified as entity 182 and entity 184. These entities can, for example, be customer entities, vendor entities, product entities, etc. FIG. 2 also shows that client data synchronization system 130 illustratively includes change tracking component 186, data synchronization component 188, data import/export component 190, client configuration component 192, provisioning component 194, conflict handling system 196, synchronization management component 198 and staging data store 200.

FIG. 2 also shows that business data store 142 in instance 104 includes a set 202 of entities to be synchronized. Those entities includes entity 204 and entity 206. Client data synchronization system 146 in instance 104 also includes change tracking component 208, data synchronization component 210, data import/export component 212, client configuration component 214, provisioning component 216, synchronization management component 218, conflict handling system 220 and staging data store 222.

FIG. 2 shows that data store 172 in central data storage system 108 not only includes a superset of the entities to be synchronized from instances 102 and 104, but it also includes the schemas for those entities from instances 102 and 104. The entities to be synchronized along with their schemas is indicated by block 224 in FIG. 2.

It may be that the schemas used to represent the same entity in instances 102 and 104 may be slightly different. For instance, the schema used to represent a customer entity in instance 104 may include four address fields, while the schema used to represent the customer entity in instance 104 may include two additional address fields. Thus, system 108 keeps a superset of the schemas, even though they may be primarily overlapping with respect to any given entity.

The data synchronization system 174 in system 108 illustratively includes a change tracking component 226, and conflict handling system 228 (which includes conflict detection component 230 and conflict resolution component 232). It also illustratively includes data import/export component 234 and staging data store 236.

A more detailed discussion of the various components is included below. Briefly, however, the change tracking components 186 and 208 in instances 102 and 104 illustratively track when a user has made a change to an entity that is to be synchronized. Data synchronization components 188 and 210 intermittently begin the synchronization process by which changes are synchronized to central data storage system 108 and data to be synchronized from system 108 (e.g., changes made in the other instances) is downloaded to the given business instance. Data import/export components 190 and 212 illustratively prepare the information to be uploaded to system 108 and receive the information downloaded therefrom. Client configuration components 192 and 214 generate user interface displays so that a user can configure the business system instance (to which the client configuration component belongs) to be connected to central data storage system 108. Provisioning component 194 illustratively generates user interface displays that allow a user to identify the particular entities that are to be synchronized, and synchronization management components 198 and 218 illustratively allow a user to set up the particular details of the synchronization process, such as whether it is to be initiated manually or automatically and, if automatically, the schedule upon which it is to be initiated. Staging data stores 200 and 222 illustratively store data that is to be sent to system 108, and as it is received therefrom. Conflict handling systems 196 and 220 illustratively identify conflicts in data to be synchronized and handle those conflicts (either automatically or by generating user interface displays so that they can be resolved manually, or in other ways).

The components in central data storage system 108 will also described in greater detail below. Briefly, however, change tracking component 226 identifies which particular instances need to have data synchronized to them, based upon changes to various entities received from other instances. By way of example, if instance 102 sends a change to a given entity that is to be synchronized to instance 104, change tracking component 226 identifies this so that the next time instance 104 calls for data, the data from instance 102 is identified and sent to instance 104. Staging data store 236 stores the synchronization data received from the various instances, so that conflict handling system 228 can use conflict detection component 230 to detect conflicts and conflict resolution component 232 to resolve them. Once the data is ready, it can be sent to the various instances 102 and 104 (as they ask for it) by data import/export component 234.

Figure 3:
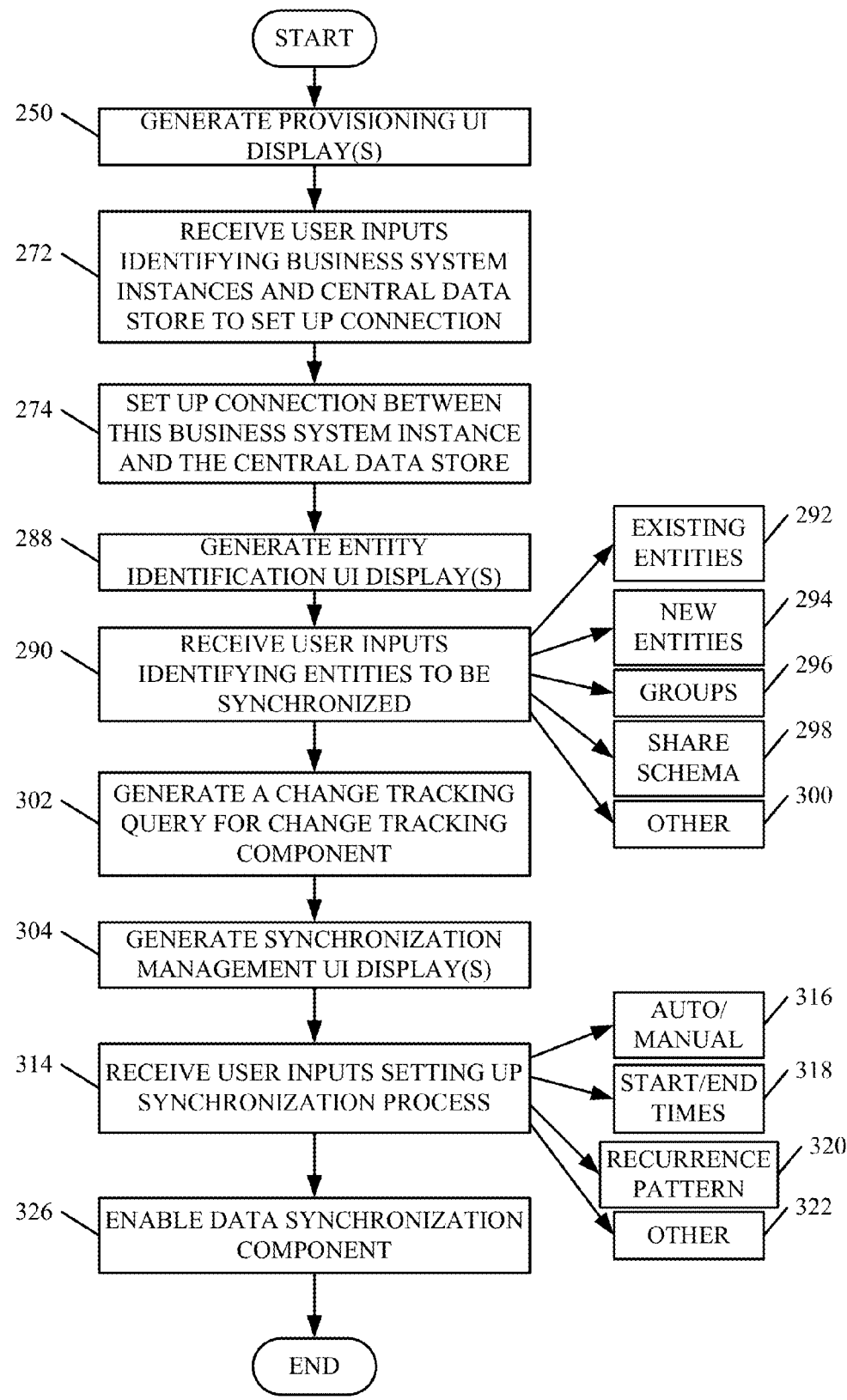
FIG. 3 is a flow diagram illustrating one embodiment of the operation of the system shown in FIG. 2 in configuring the system for data synchronization.

FIG. 3 is a flow diagram illustrating one embodiment of the operation of one of instances 102 and 104 in going through the setup process so that it can connect with central data storage system 108 and synchronize information with other instances. For the sake of the present discussion, the description will proceed with respect to business system instance 102, but the flow diagram shown in FIG. 3 is applicable to the other instances as well.

Figure 3A:
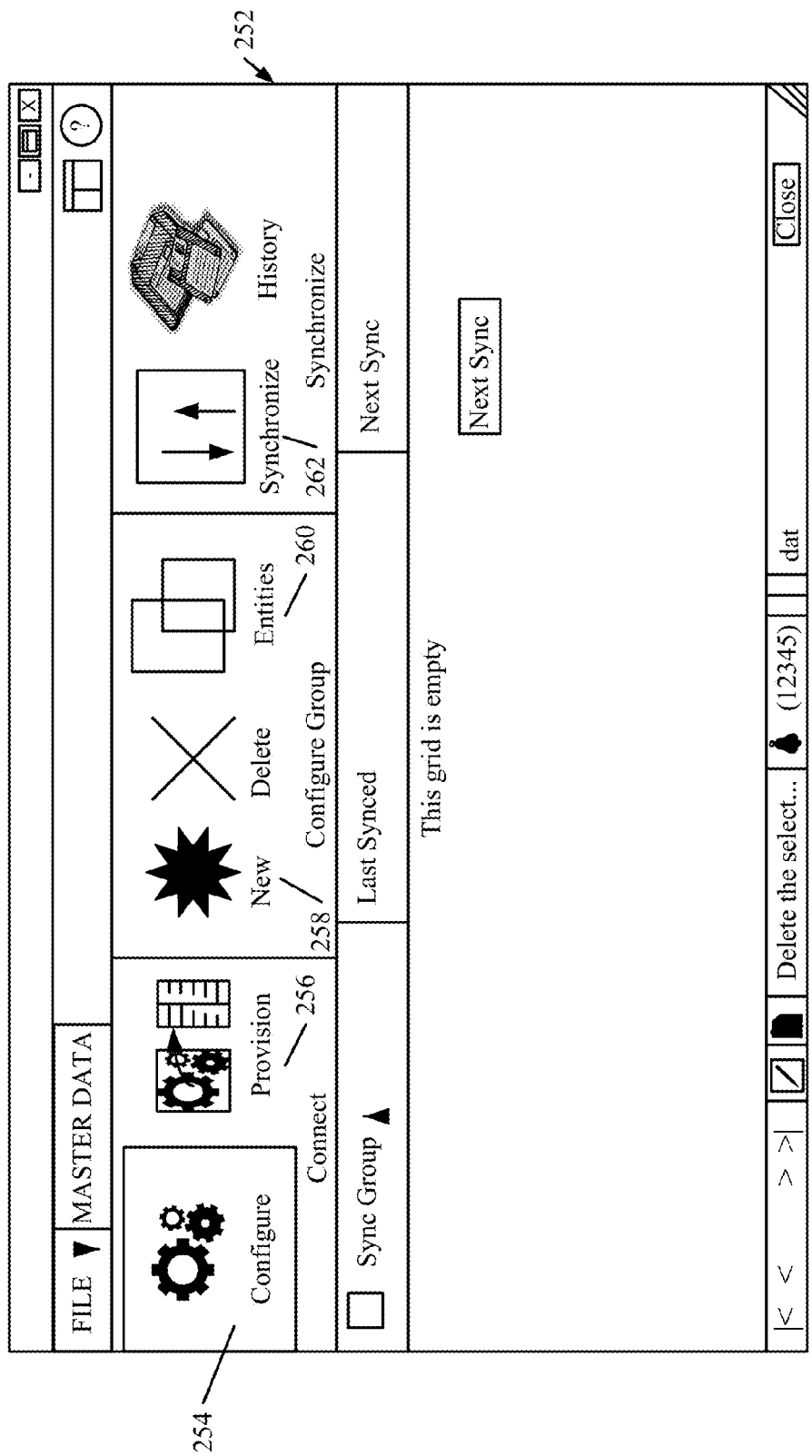
FIGS. 3A-3F show illustrative user interface displays.

In one embodiment, client configuration component 194 first generates a user interface display so that instance 102 can connect with central data storage system 108. This is indicated by block 250 in FIG. 3. FIG. 3A is one embodiment of a user interface display 252 that can be generated by client configuration component 192 in order to do this. User interface display 250 is illustratively generated by client data synchronization system 130 and includes a plurality of user-actuable input mechanisms, such as configure mechanism 254, provision mechanism 256, new mechanism 258, entities mechanism 260, synchronize mechanism 262, among others. When the user actuates configure mechanism 254, the user is illustratively navigated to another user interface display screen that allows the user to identify a particular central data storage system 108 that instance 102 is to connect with in order to synchronize data.

Figure 3B:
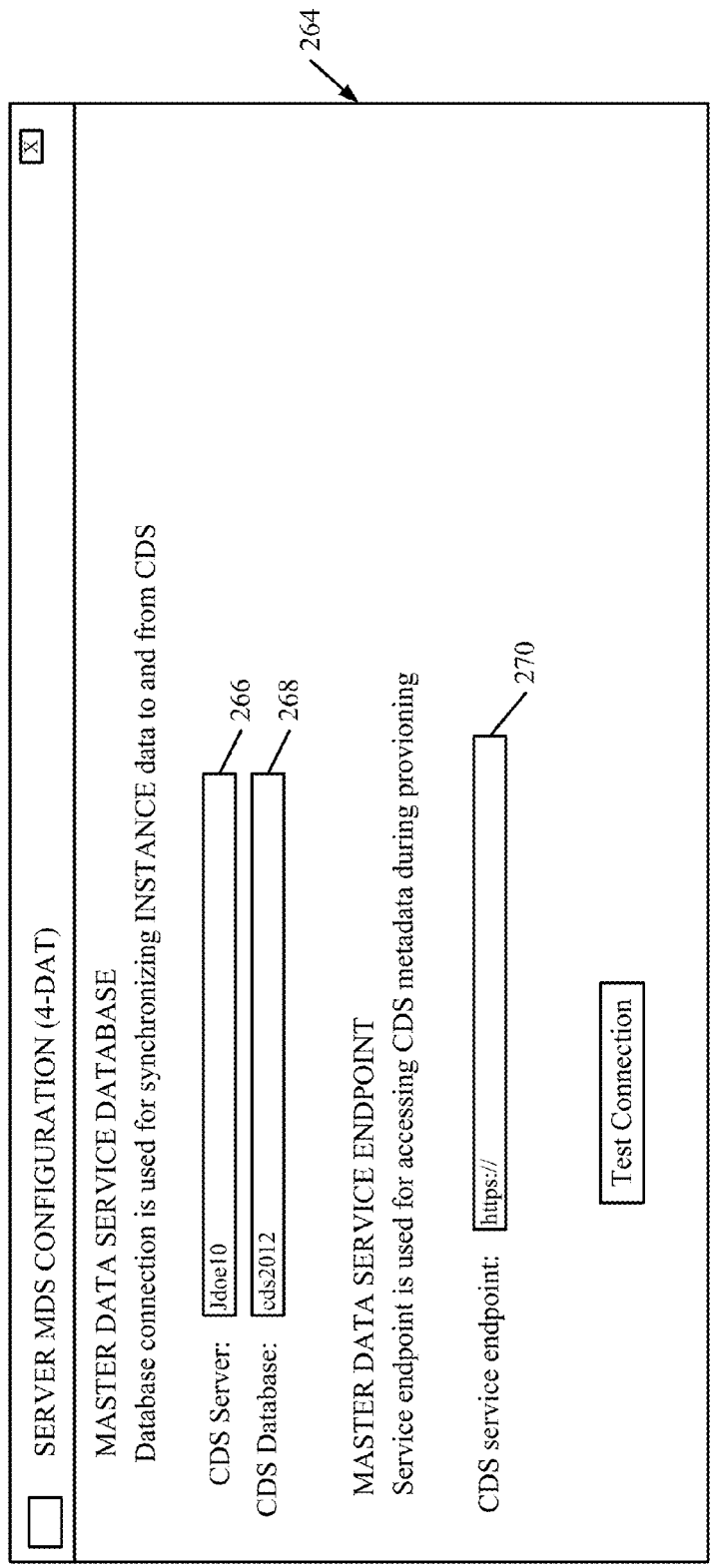

FIG. 3B shows one embodiment of a user interface display 264 for doing this. User interface display 164 includes a user input mechanism 266 that allows the user to specify a particular server, and user input mechanism 268, that allows the user to specify a given database (both in data storage system 108). Display 264 also illustratively includes a user input mechanism 270 that allows the user to specify an endpoint that is used for accessing metadata in storage system 108, during the configuration process. Receiving the user inputs identifying the central data storage system 108 and the particular servers and databases and endpoints for connection is indicated by block 272 in the flow diagram of FIG. 3. Setting up that connection is indicated by block 274.

Figure 3C:
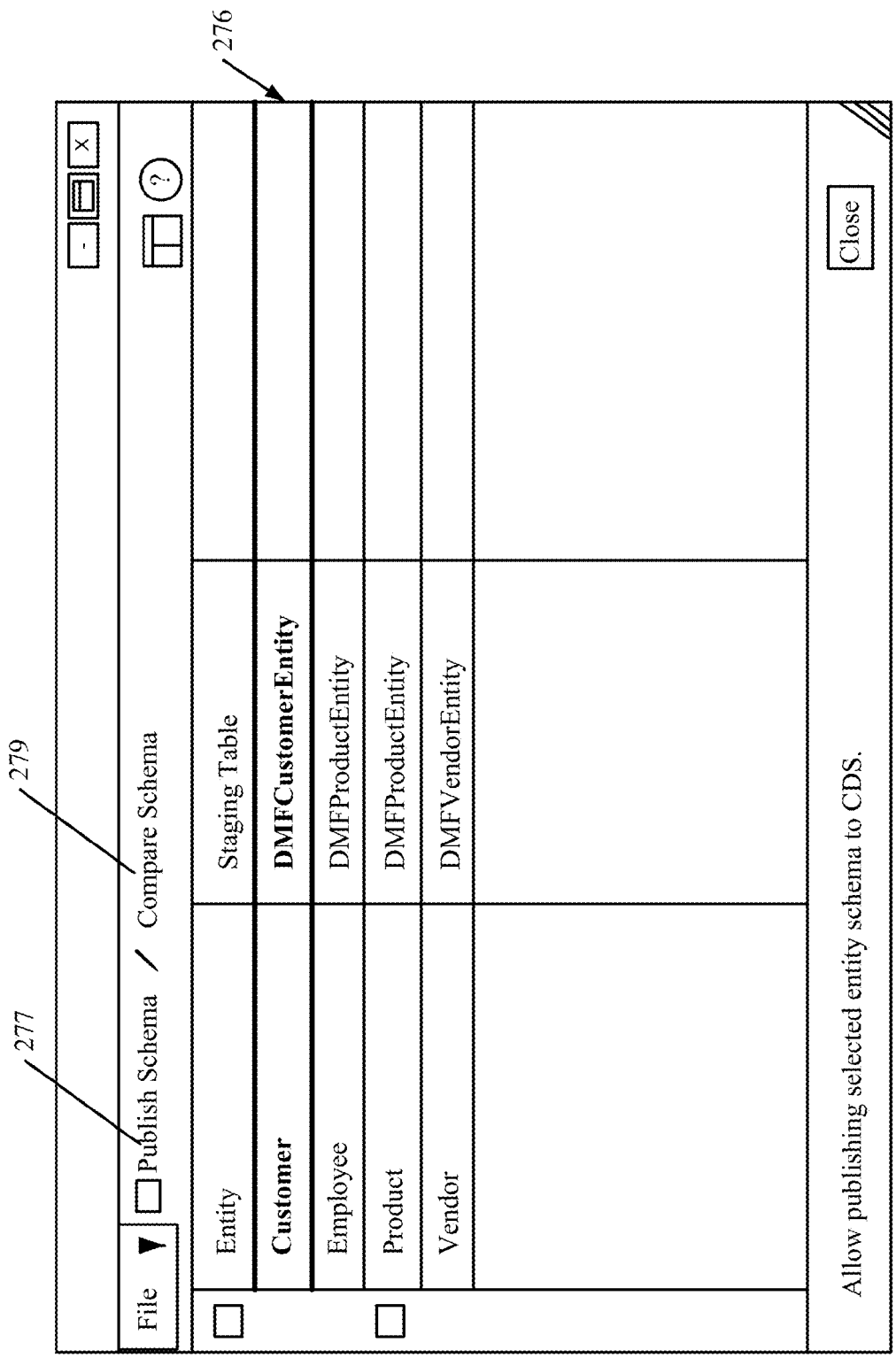

Once these steps of the configuration are complete, provisioning component 194 illustratively generates provisioning user interface displays that allow the user to identify particular entities that are to be synchronized with other instances. For example, when the user actuates the provision mechanism 256 in FIG. 3A, the user can illustratively be navigated to a set of user interface displays, such as display 276 in FIG. 3C. Display 276 illustratively allows the user to select one or more already-existing entities to be synchronized among the various instances. Those shown in FIG. 3C include the customer entity, the employee entity, the product entity and the vendor entity. Display 276 also identifies the particular staging table where the information is to be placed, in the business instance, during synchronization.

Figure 3D:
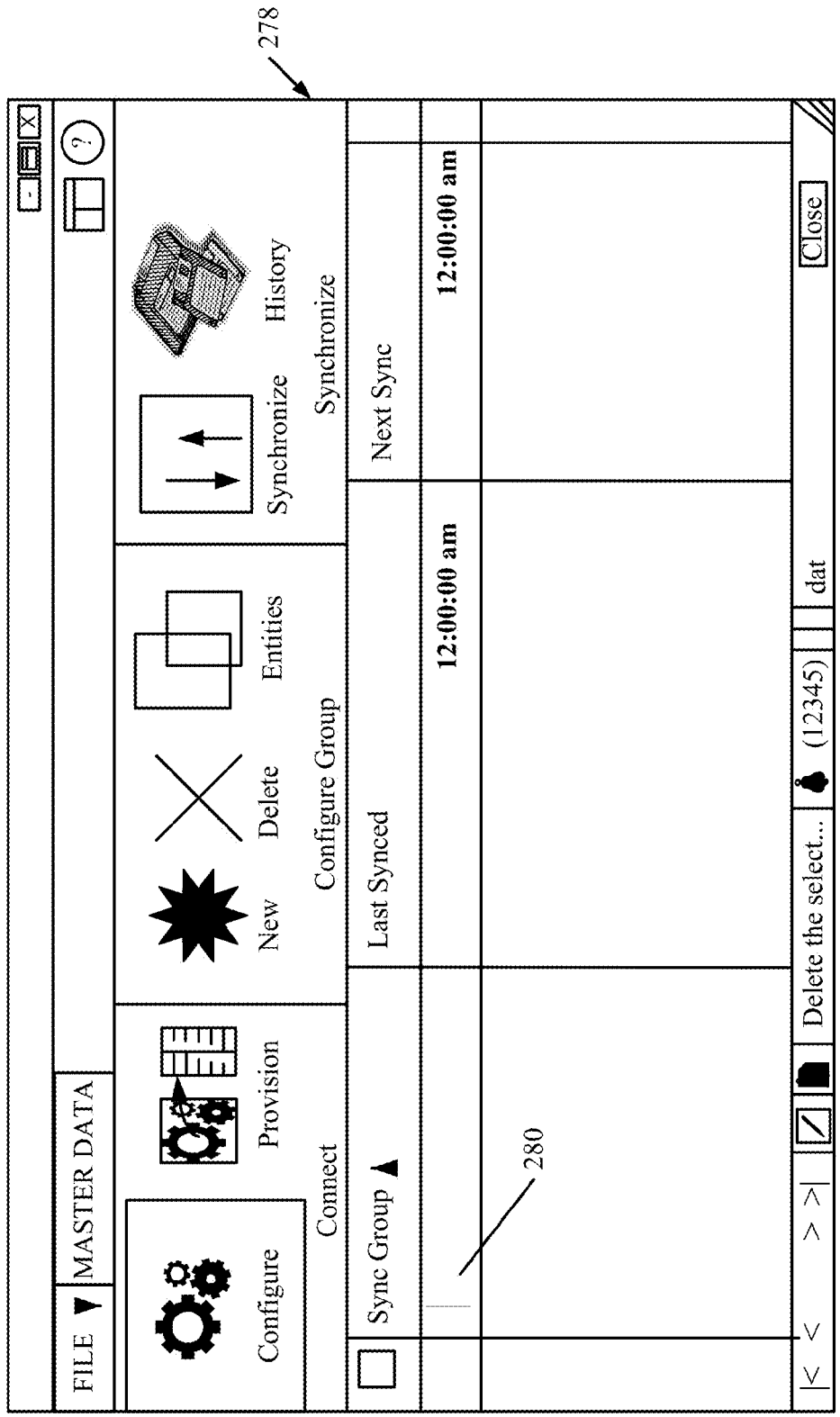
Figure 3E:
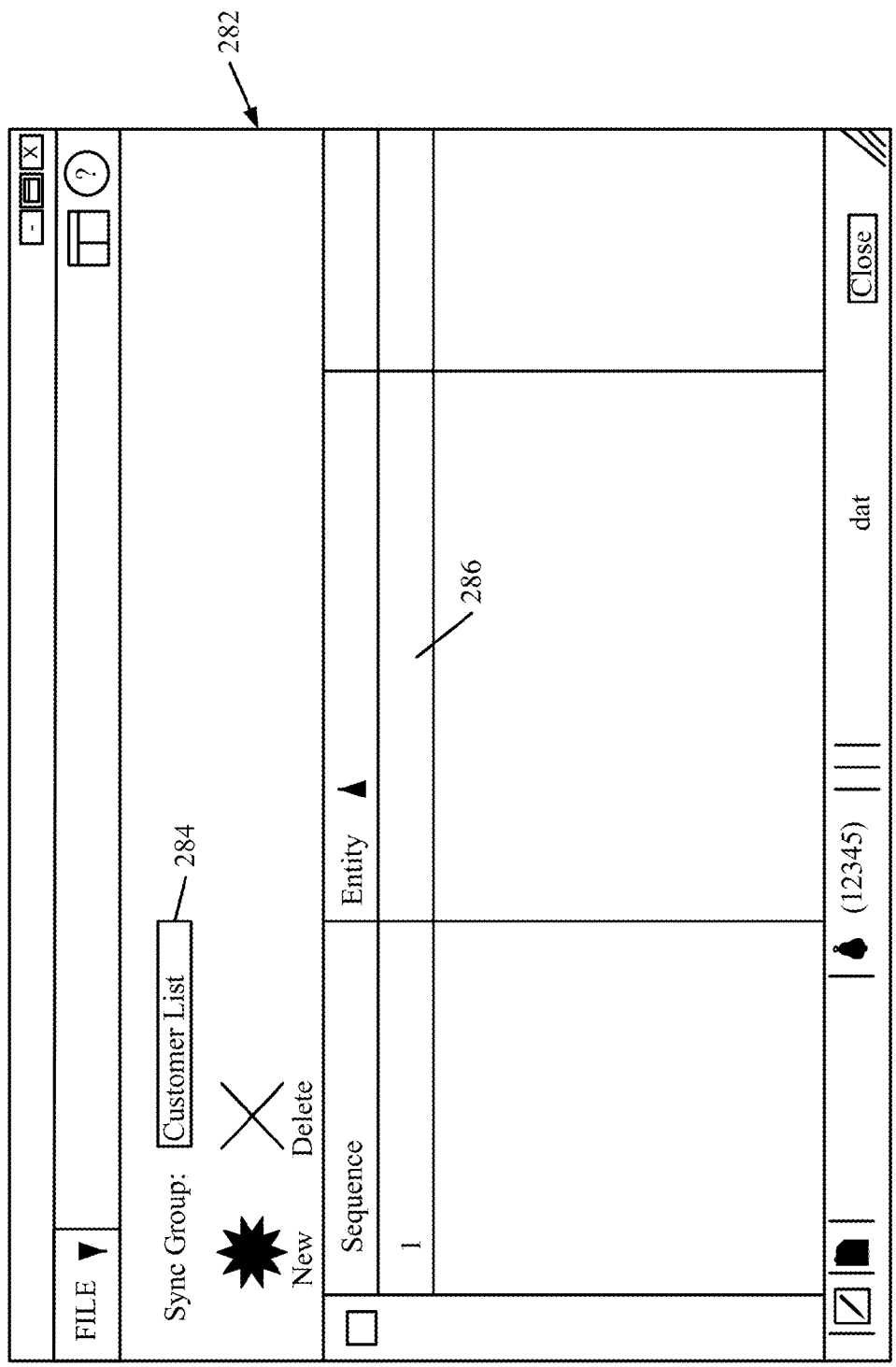

It should be noted that the user can also illustratively identify new entities or entities in groups, so that a group of entities is synchronized. By way of example, when the user actuates the new user input mechanism 258 in FIG. 3A, the user may illustratively be navigated to one or more user interface display screens that allow the user to configure a new entity or a new group of entities to be synchronized. FIG. 3D shows one embodiment of a user interface display 278 for doing this. FIG. 3D illustratively includes a user input mechanism 280, such as a text field, which allows a user to name a synchronization group. FIG. 3E shows a user interface display 282 where the user has named the synchronization group "customer list" as displayed in field 284. The user can then use user input mechanism 286 (which may illustratively be a drop down menu) to select entities and add them to the "customer list" group. Generating the user interface displays for allowing a user to identify entities to be synchronized, and receiving the user inputs identifying entities are indicated by blocks 288, and 290 in the flow diagram of FIG. 3. As discussed above, the entities can be existing entities 292, new entities 294 or groups 296.

Referring again to FIG. 3C, it also shows two user input mechanisms that allow the user to manipulate the schemas corresponding to the selected entities. For instance, user input mechanism 277 allows the user to publish the schemas corresponding to the selected entities to central data storage system 108. User input mechanism 279 causes client data synchronization system 130 to compare schemas to other schemas corresponding to that entity, so that the user can see the differences. In any case, the identity of the entities to be synchronized, along with their corresponding schemas, are illustratively identified by the user so that they can be sent to central data storage system 108 during the configuration process.

Sharing the schemas is indicated by block 298. Of course, the user can input other information as well, and this is indicated by block 300 in the flow diagram of FIG. 3.

Based upon the user inputs, change tracking component 186 in client data synchronization system 130 illustratively generates one or more change tracking queries for tracking the changes to the identified entities. For instance, the change tracking queries will illustratively access data in business data store 126 to determine whether the entities to be synchronized have changed since the last synchronization operation. Generating a change tracking query for tracking the changes in the identified entities can be done manually or automatically and is indicated by block 302 in the flow diagram of FIG. 3.

Once provisioning is complete, synchronization management component 198 illustratively generates synchronization management user interface displays that allow the user to set up the synchronization operation. This is indicated by block 304 in FIG. 3.

Figure 3F:

FIG. 3F shows one embodiment of a user interface display 306 that can be generated so that the user can manage the synchronization operations for that given instance. It can be seen that display 306 illustratively includes a time zone mechanism 308 that allows the user to specify a time zone, along with a set user input mechanisms 310 that allow the user to set the recurrence schedule for the synchronization operation. Mechanisms 310 illustratively allow the user to set a start time and date upon which synchronization is to commence, and also to set an end date or a number of synchronization operations, after which the synchronization schedule is to terminate. User interface display 306 also illustratively includes a set of input mechanisms 312 that allow the user to set the recurrence pattern for the synchronization operation. For instance, the user can set the recurrence to occur after a certain number of minutes, hours, days, weeks, months, years, etc. In one embodiment, the user can also indicate that the synchronization operation is to be initiated manually. Receiving the user input setting up the synchronization operation is indicated by block 314 in the flow diagram of FIG. 3. Setting it to be automatic or manual is indicated by block 316, and setting the start and end times is indicated by block 318. Setting the recurrence pattern is indicated by block 320. Of course the user can provide other management inputs as well, and this is indicated by block 322.

The user then illustratively enables data synchronization component 188 to initiate the synchronization process, as it has been configured. This can be done, for instance, by the user simply clicking the OK user input mechanism 324 in FIG. 3F. Of course, this can be done in other ways as well. Enabling the data synchronization component is indicated by block 326 in the flow diagram of FIG. 3.

Figure 4:
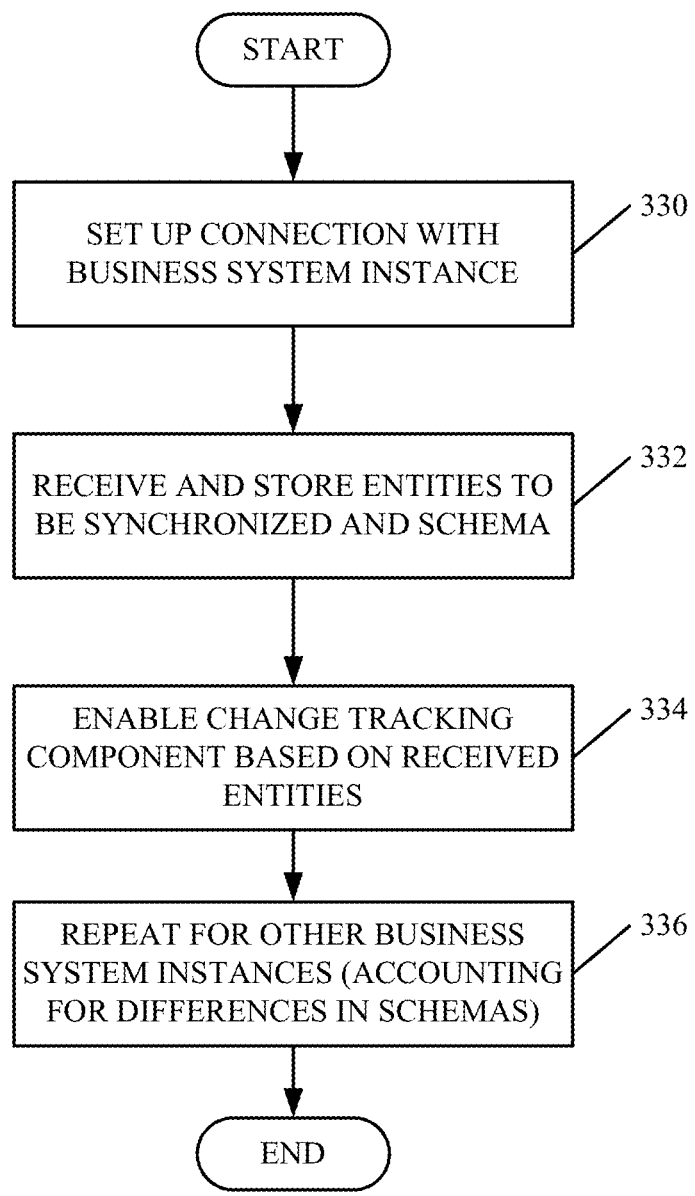
FIG. 4 is a flow diagram illustrating one embodiment of the operation of the system shown in FIG. 3 in configuring a central data storage system for synchronization.

FIG. 4 is a flow diagram illustrating one embodiment of the operation of central data storage system 108 during the configuration process. That is, FIG. 4 is flow diagram showing the configuration process from the perspective of central data storage system 108.

System 108 first receives a request to set up a connection with a given business system instance (in this case business system instance 102). Data synchronization system 174 illustratively sets up that connection. This is indicated by block 330 in FIG. 4. Data synchronization system 174 then receives and stores the identity of the entities to be synchronized, along with their schemas, from business system instance 102. This is indicated by block 332 in FIG. 4. System 108 then enables its change tracking component 226 to track changes to those entities, as they are made and uploaded by the various instances that subscribe to system 108. Enabling the change tracking component is indicated by block 334 in FIG. 4. Central data storage system 108 illustratively repeats this process for other business system instances, accounting for differences in schemas for a given entity. For example, as briefly discussed above, when other business system instances wish to synchronize data for one or more of the same entities as instance 102, but the schemas in that instance are different, then central data storage system 108 stores not only an identification of the entities to be synchronized, but a superset of the schemas for those entities, from among the various instances. Repeating this for other business system instances, accounting for differences in schemas, is indicated by block 336 in FIG. 4.

Figure 5:
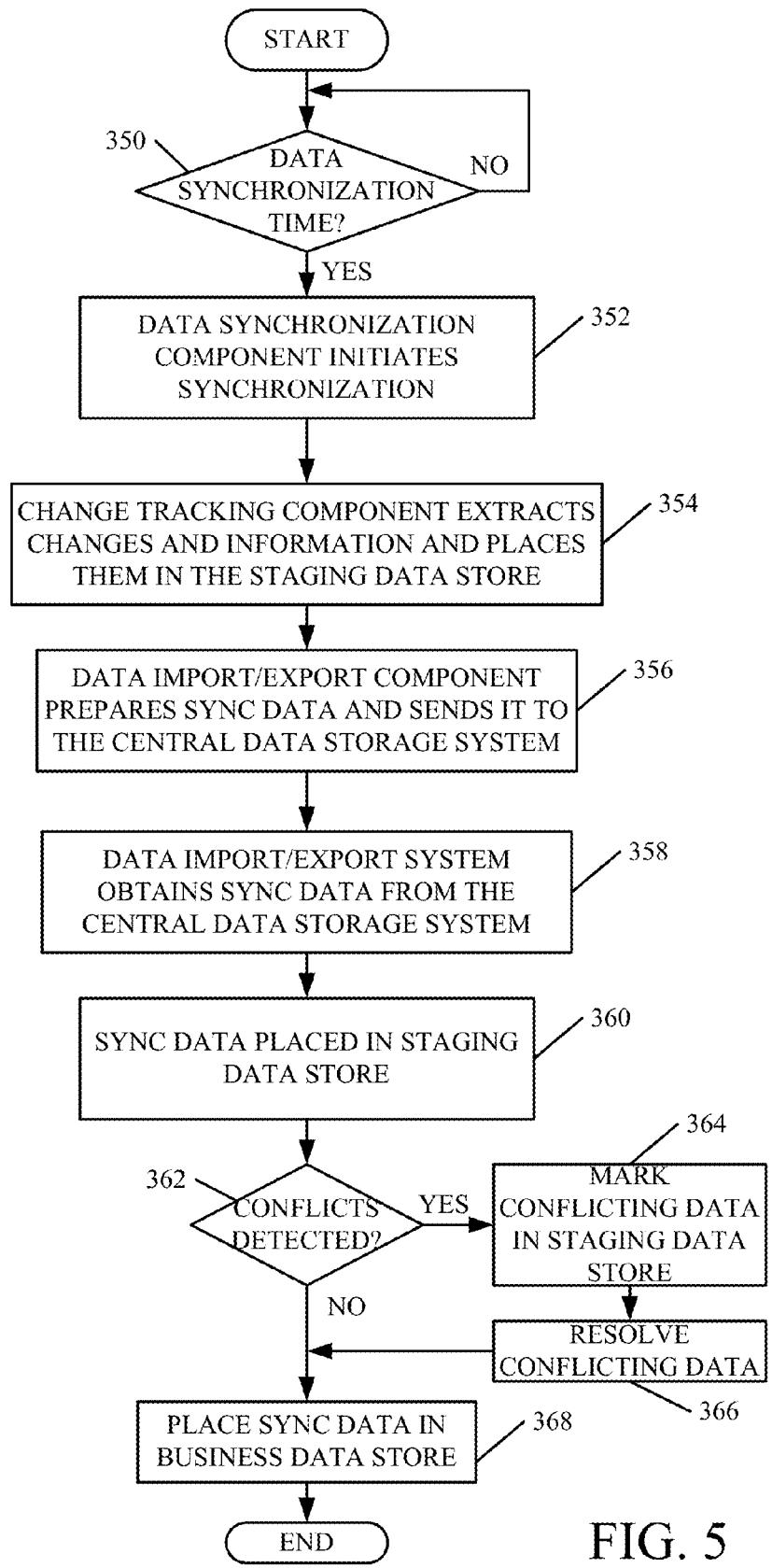
FIG. 5 is a flow diagram illustrating one embodiment of the operation of the system shown in Figure in synchronizing data from the perspective of an instance of the business system.

FIG. 5 is a flow diagram illustrating one embodiment of the operation of business system instance 102 in performing a synchronization operation. It will be appreciated that the same operation can be performed in other business system instances, during their synchronization, and the description of the flow diagram shown in FIG. 5 with respect to business system instance 102 is provided for the sake of example only.

Data synchronization component 188 in instance 102 first determines whether it is time to synchronize data. In doing so, data synchronization component 188 illustratively accesses the recurrence schedule and other synchronization setup information input by the user during the configuration process. Determining whether a synchronization process should commence is indicated by block 350 in FIG. 5.

If so, data synchronization component 188 initiates the synchronization process. This is indicated by block 352. Change tracking component 186 first examines the business data store 126 to determine whether any of the entities that are to be synchronized have changed since the last synchronization process. If so, an indication of those changes, along with an entity identifier identifying the entity, are placed in staging data store 200. Extracting the changes and placing them in data store 200 is indicated by block 354 in the flow diagram of FIG. 5.

Data import/export component 190 then prepares the synchronization data in staging data store 200 to be sent to central data storage system 108. It then sends that information to central data storage system 108. This is indicated by block 356 in FIG. 5. In one embodiment, the data is pushed to system 108, although it can be held for retrieval by system 108 as well.

During the same synchronization process, data import/export component 190 receives any synchronization data that central data storage system 108 has prepared for it. For instance, if other instances have changed entities that are to be synchronized to instance 102, then that information is obtained by data import/export component 190 in instance 102. Obtaining synchronization data from system 108 is indicated by block 358 in FIG. 5.

Data import/export component 190 places the newly received synchronization data in staging data store 200. This is indicated by block 360.

Conflict handling system 196 then examines the newly received synchronization data in staging data store 200 to identify conflicts. A conflict may occur, for instance, when, during a synchronization operation, instance 102 transmits a change in an item of data on a given entity to central data storage system 108, but during that same synchronization process, central data storage system 108 transfers to instance 102 a change to that same item of data, on that same entity, that has been made from another instance. This is described in greater detail below with respect to FIGS. 6A and 6B. Suffice it to say, for now, that if conflict handling system 196 detects any conflicts in the data in staging data store 200, the conflicts are marked and resolved, if possible. Identifying the conflicts is indicated by block 362 in FIG. 5, marking the conflicts in the staging data store 200 is indicated by block 364 in FIG. 5, and resolving the conflicts in data is indicated by block 366.

Once the staging data in data store 200 has had its conflicts resolved, data import/export component 190 illustratively imports it into business data store 126 in business system instance 102. This is indicated by block 368 in FIG. 5.

Figure 6:
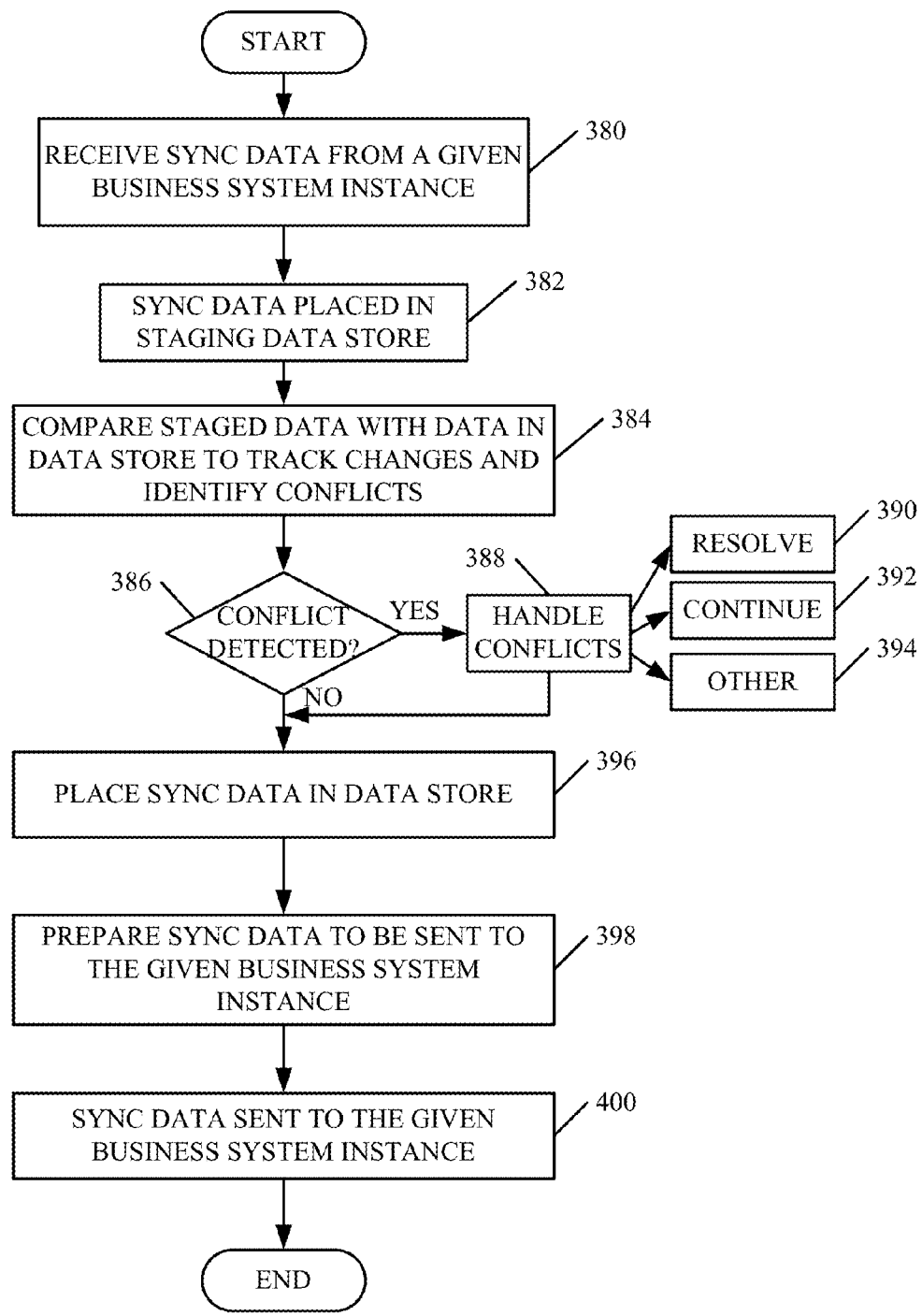
FIG. 6 is a flow diagram illustrating one embodiment of the operation of the system shown in FIG. 3 in synchronizing data from the perspective of a central data storage system.

FIG. 6 is a flow diagram illustrating one embodiment of the operation of central data storage system 108 during a synchronization process. That is, FIG. 6 shows the operation of system 108, from the standpoint of system 108, during the synchronization process being conducted by one of instances 102-104. Data import/export component 234 illustratively receives synchronization data from a given business data instance (in this case instance 102). This is indicated by block 380 in FIG. 6. Component 234 places the synchronization data in staging data store 236. This is indicated by block 382.

Change tracking component 226 compares the data with data stored in data store 172 to determine what other instances may need to have the data synchronized to them. Conflict detection component 230 also examines the data to detect any conflicts. Comparing the stage data with the data in data store 172 and detecting conflicts are indicated by block 384 in FIG. 6.

If conflicts are detected, conflict resolution component 232 illustratively attempts to resolve the conflicts. This is indicated by blocks 386 and 388 in FIG. 6. Some conflicts can illustratively be automatically resolved as indicated by block 390. Others are simply held for later resolution (such as manual resolution). This is indicated by block 392. Other actions can be taken to handle conflicts as well, and this is indicated by block 394.

By way of example, conflicts can be automatically resolved by accessing a set of conflict resolution rules. For instance, it may be that only certain instances are authorized to change certain entities. Further, it may be that a hierarchy of changes is set up so that when there is a conflict, the changes of one instance prevail over those of another instance. In that case, during the next synchronization operation, only the changes made by the highest ranking instance will be synchronized to the other instances. Other rules can be used to resolve conflicts as well.

In any case, once the conflicts are resolved, all non-conflicting synchronization data is placed in data store 172. This is indicated by block 396 in FIG. 6. When a given instance calls to receive synchronization data, all of the data that needs to be synchronized to that instance is prepared by data import/export component 234. This is indicated by block 398 in FIG. 6. The synchronization data is then sent to the given business system instance, where it is handled as described above with respect to FIG. 5. This is indicated by block 400 in FIG. 6.

Figure 6A:
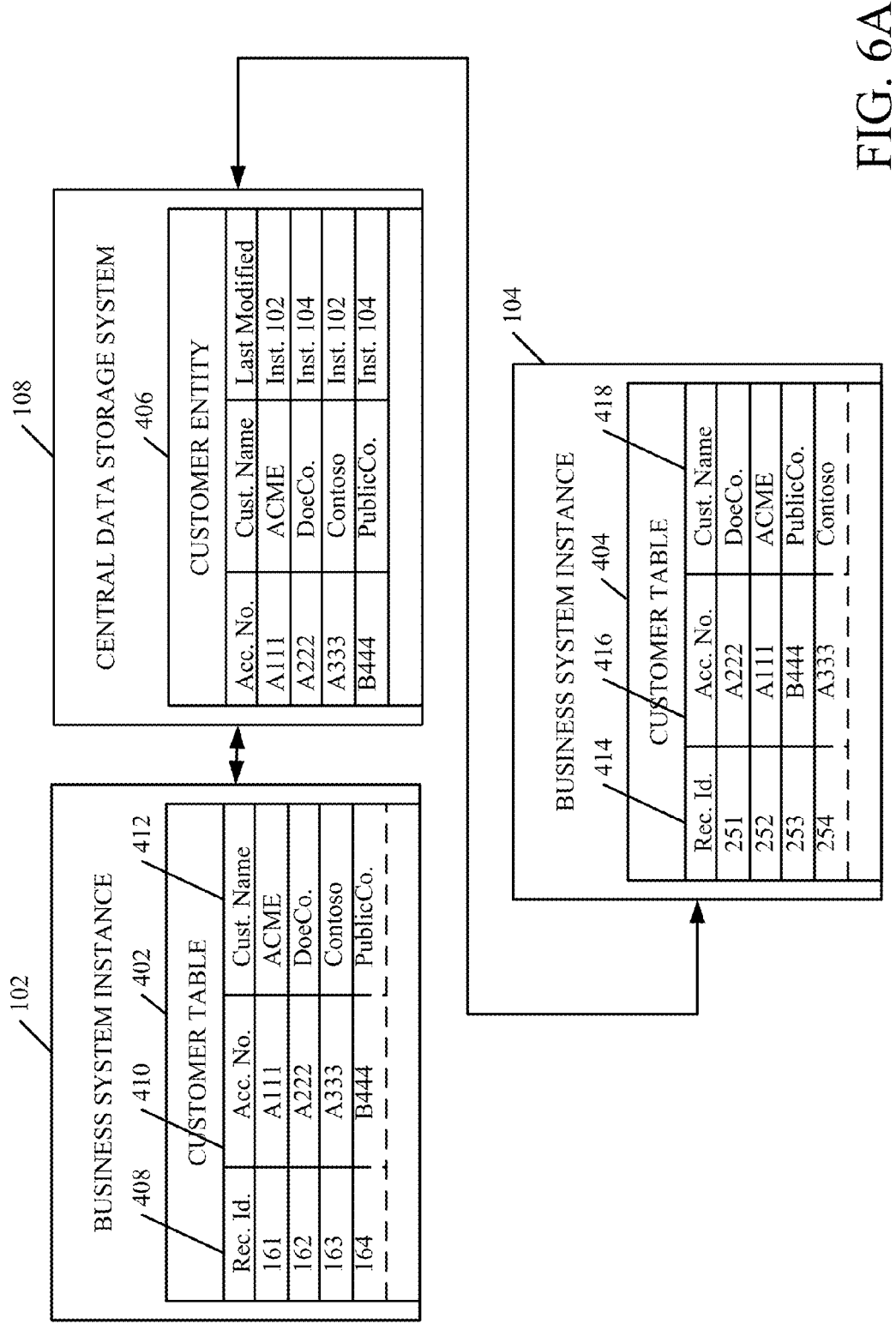
FIGS. 6A and 6B illustrate synchronization, as well as conflict detection and resolution.

FIG. 6A shows one embodiment of a particular table in business system instance 102 and in business system instance 104. It also shows a representation of an entity corresponding to that table in central data storage system 108. FIG. 6A shows one representation of how data is synchronized between instances 102 and 104. Instance 102 is shown as having a customer table 402. Instance 104 also has a customer table 404. Central data storage system 108 has a data structure representing the customer entity 406. It can be seen that customer entity 406 contains all of the information from both tables 402 and 404, except instance-specific information, such as the record ID.

More specifically, customer table 402 illustratively has a customer ID 408, an account number 410 and a customer name 412. Customer table 404 also includes a record ID 414, an account number 416 and a customer name 418. Customer entity 406, however, does not include the instance-specific information, such as the record IDs 408 and 414 from instances 102 and 104, respectively. Other than that, however, it includes a superset of the information contained in tables 402 and 404.

By way of example, when a user of instance 102 enters the customer name "ACME" for account number A111, the information is synchronized to central data storage system 108. It can be seen that the information was last modified by instance 102. A user of instance 104 then enters a customer name for account A222. That information is also synchronized to central data storage system 108, where it can be seen that it was last modified by instance 104. The customer name for account number A111 is then synchronized to instance 104 where it is entered in customer table 104. The customer name for account number A222 is then synchronized to instance 102 where it is entered in customer table 402. The user of instance 102 then enters a customer name for account number A333. That is synchronized to system 108 and eventually to business system instance 104.

FIG. 6A shows that a user of business system instance 104 has entered a new account number B444 with a customer name PublicCo. That information has been synchronized back to central data storage system 108, but it has not yet been synchronized to business system instance 102. During the next synchronization operation of instance 102, it will, however, be synchronized to instance 102. This is indicated by showing it in dashed form in business system instance 102.

Figure 6B:
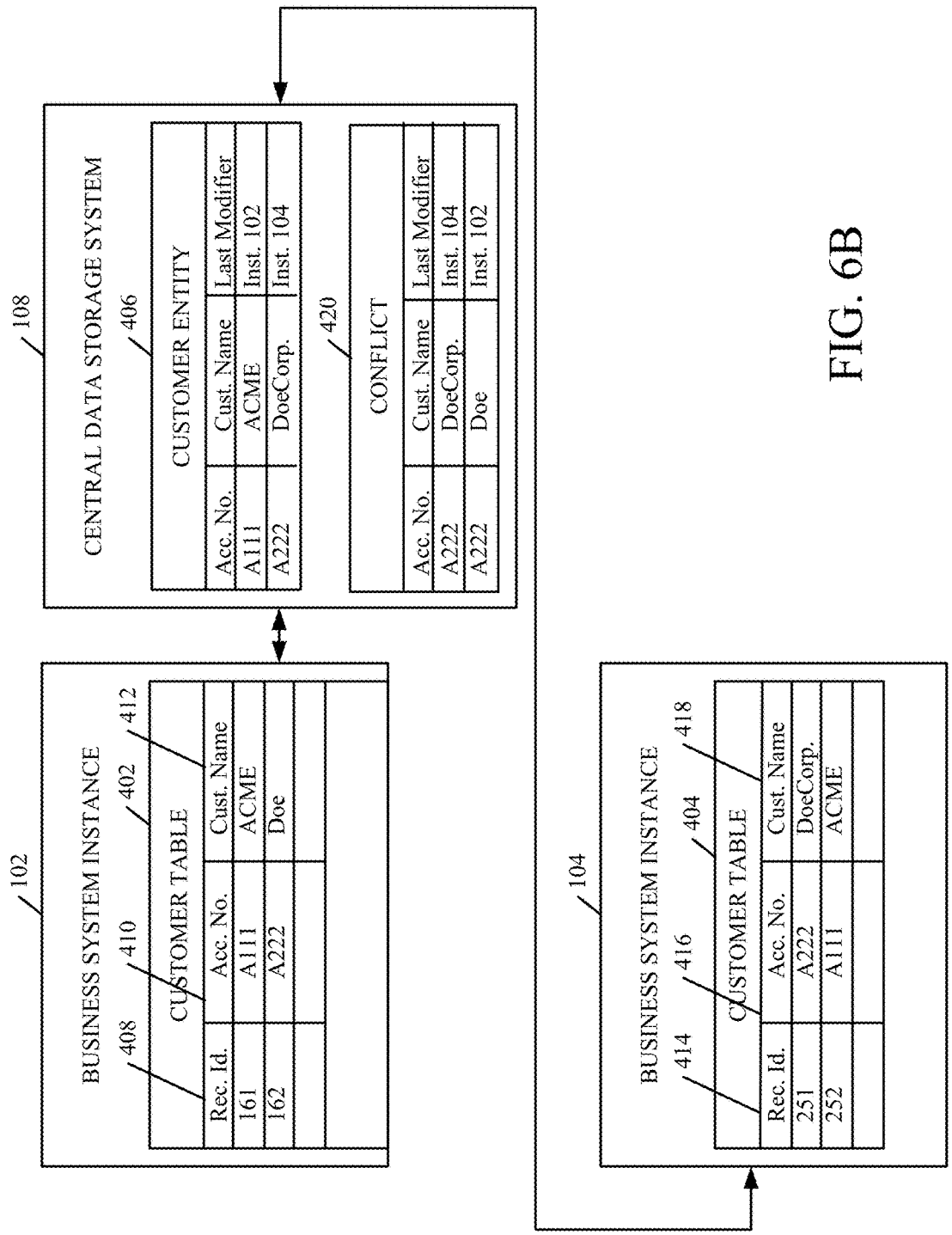

FIG. 6B shows similar items to those shown in FIG. 6A, and they are similarly numbered. However, FIG. 6B illustrates one embodiment of a conflict. In the embodiment shown in FIG. 6B, it is assumed that business system instance 104 changes the name of the customer in account A222 from "DoeCo." to "DoeCorp." That information is synchronized to customer entity 406 in central data storage system 108. However, before it can be synchronized down to business system instance 102, a user of business system instance 102 also changes the name of the customer of account A222 from "DoeCo." to "Doe".

Because the customer name for account A222 has already been changed by business system instance 104, but it has not yet been synchronized to business system instance 102, then during the next synchronization operation performed by instance 102, conflict detection component 230 in central data storage system 108 will identify the changes made to the customer name for account A222 as being in conflict. It thus places those changes in a conflict data structure 420. It will be appreciated that structure 420 can simply be part of customer entity 406 with the changes flagged or otherwise identified as being in conflict, or it can be a completely separate data structure.

From the standpoint of central data storage system 108, both instances 102 and 104 change the name of the customer for account A222, without knowing about the changes that the other had made. Thus, a conflict exists and conflict resolution is sought. Again, conflict resolution component 232 in central data storage system 108 can resolve the conflict automatically, if conflict resolution rules permit, or the conflict can be set aside for manual resolution, or otherwise.

It can thus be seen that synchronization of master data across multiple business instances is performed on the entity level. Therefore, physical table replication need not be performed. As is described below, the data synchronization can be carried out across multiple instances, when deployed in a public or private cloud architecture, or otherwise.

Figure 7:
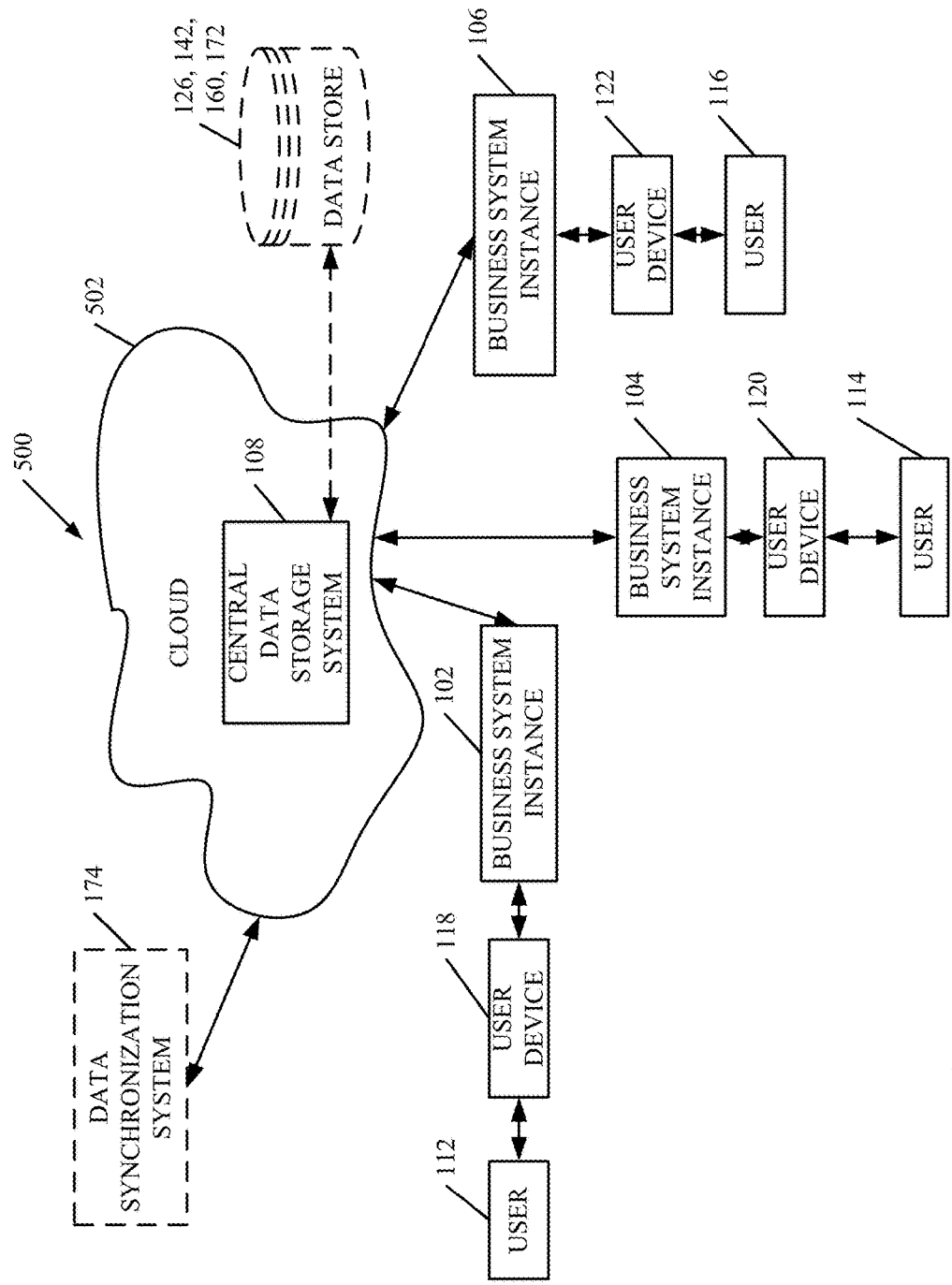
FIG. 7 shows one embodiment of the architecture shown in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 7, some items are similar to those shown in FIG. 1 and they are similarly numbered. FIG. 7 specifically shows that central data storage system 108 is located in cloud 502 (which can be public, private, or a combination where portions are public while others are private). Therefore, business system instances 102, 104 and 106 can access those systems through cloud 502.

FIG. 7 also depicts another embodiment of a cloud architecture. FIG. 7 shows that it is also contemplated that some elements of system 108 are disposed in cloud 502 while others are not. By way of example, data stores 126, 142, 160, and 172 can be disposed outside of cloud 502, and accessed through cloud 502. In another embodiment, data synchronization system 174 is also outside of cloud 502. Regardless of where they are located, they can be accessed directly by instances 102, 104 and 106, through a network (either a wide area network or a local area network), they can be hosted at a remote site by a service, or they can be provided as a service through a cloud or accessed by a connection service that resides in the cloud. Also, one or more of instances 102, 104 and 106 can be located in cloud 502. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
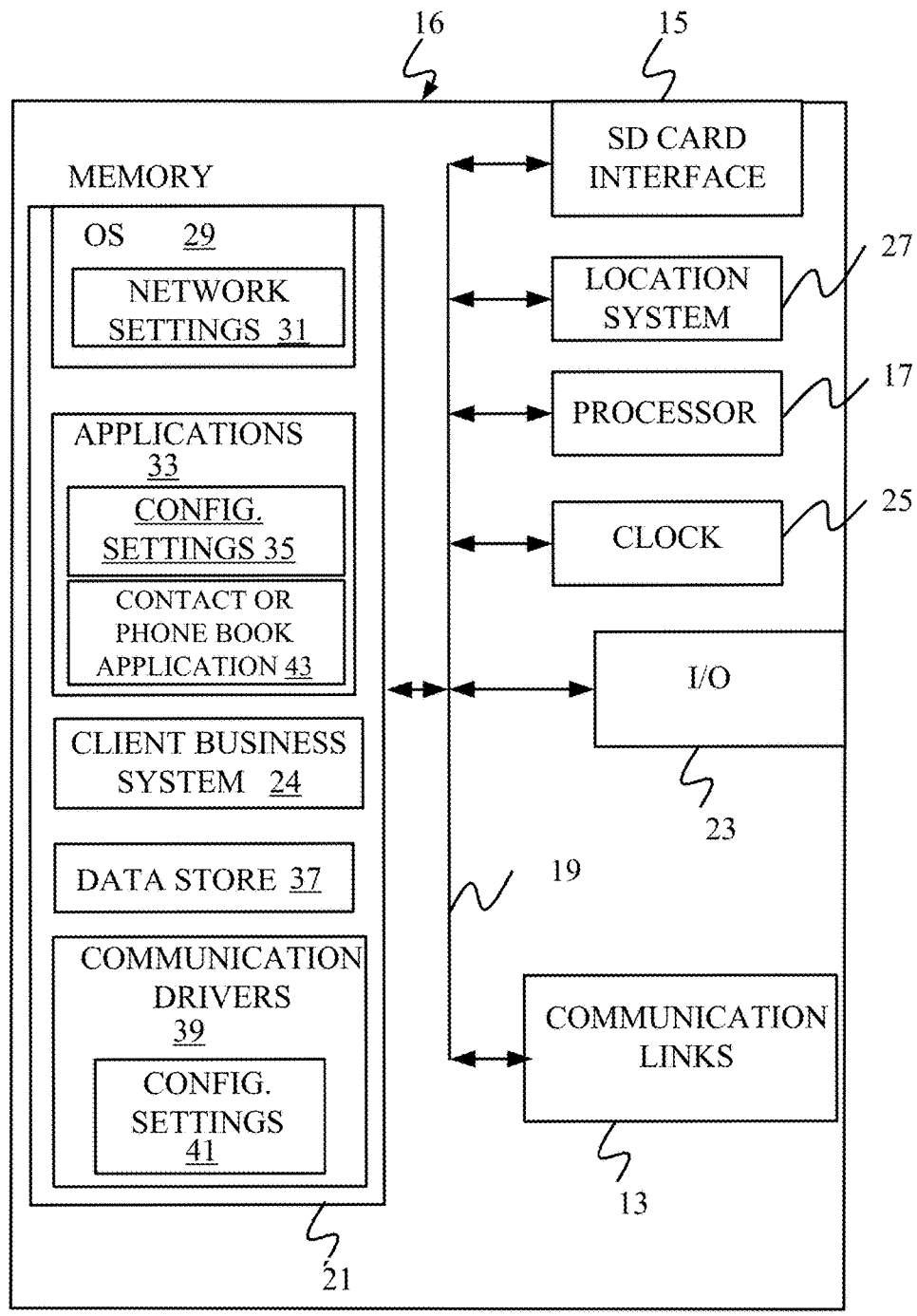
FIGS. 8-13 illustrate various embodiments of mobile devices.

FIG. 8 is a simplified block diagram of one illustrative embodiment of a handheld or mobile computing device that can be used as a user's or client's hand held device 16, in which the present system (or parts of it) can be deployed. FIGS. 9-14 are examples of handheld or mobile devices.

FIG. 8 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 124, 140, 158 or 170 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
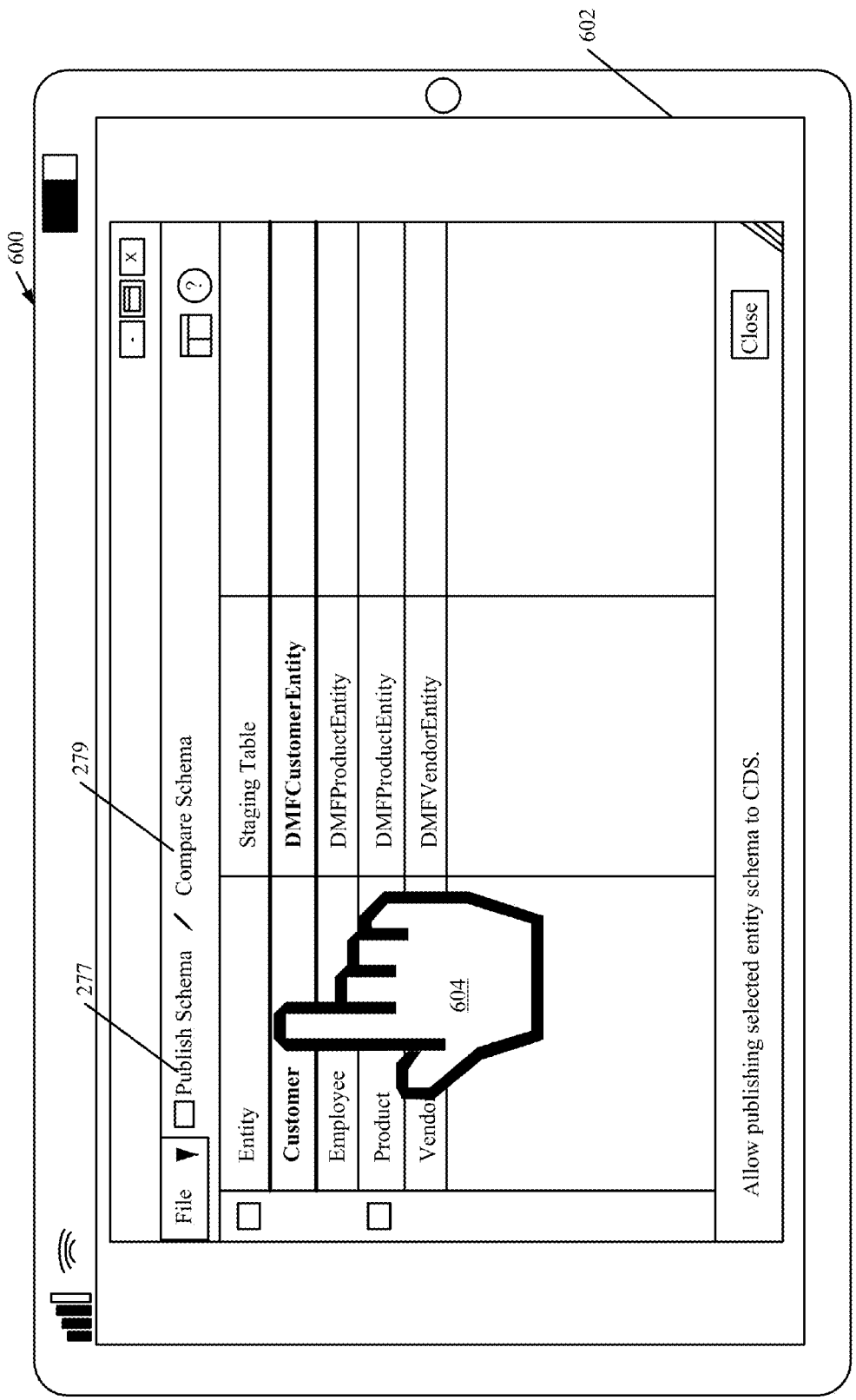

FIG. 9 shows one embodiment in which device 16 is a tablet computer 600. In FIG. 9, computer 600 is shown with the user interface display from FIG. 3C displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 10:
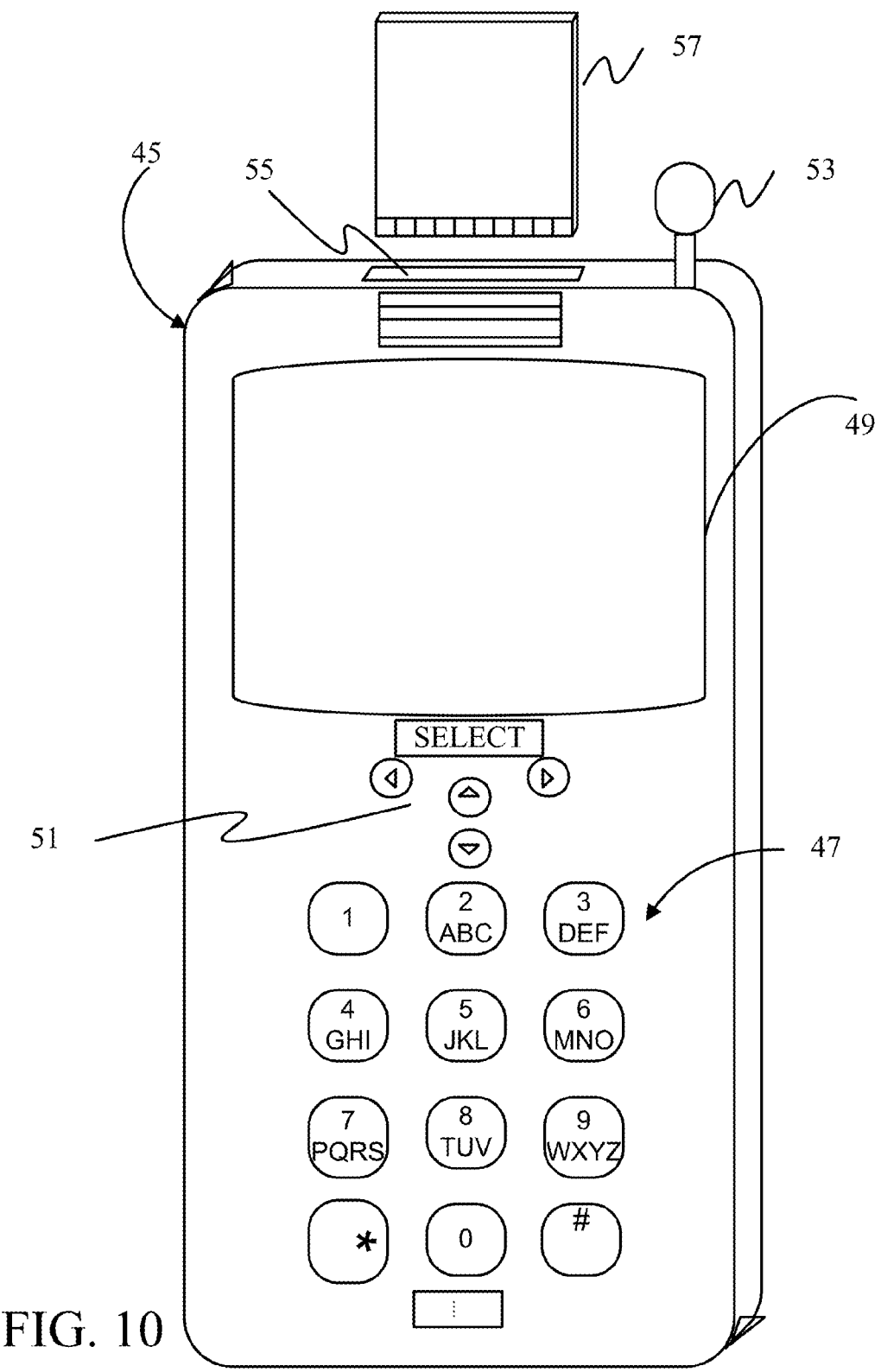
Figure 11:
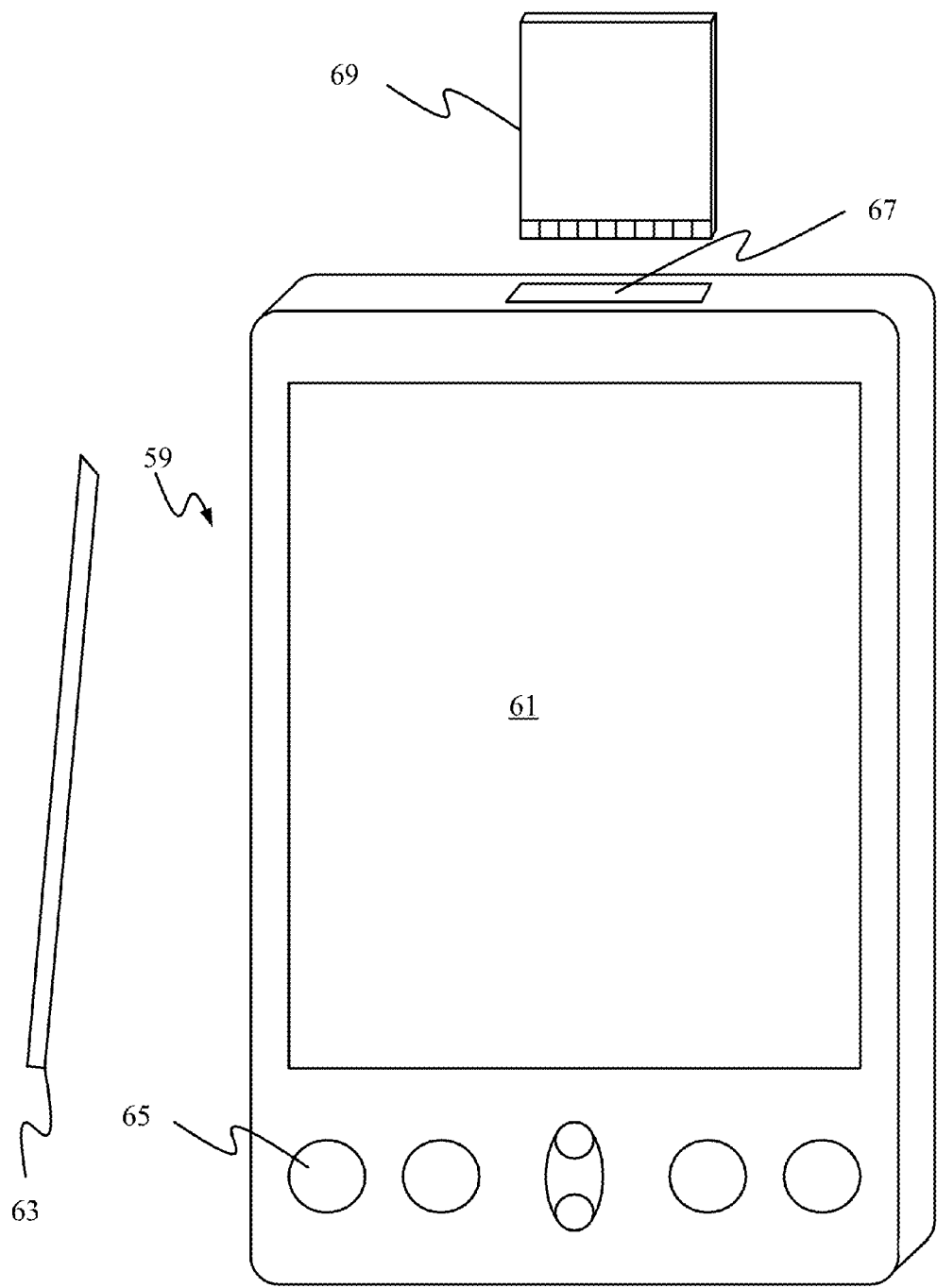

FIGS. 10 and 11 provide additional examples of devices 16 that can be used, although others can be used as well. In FIG. 10, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 12:
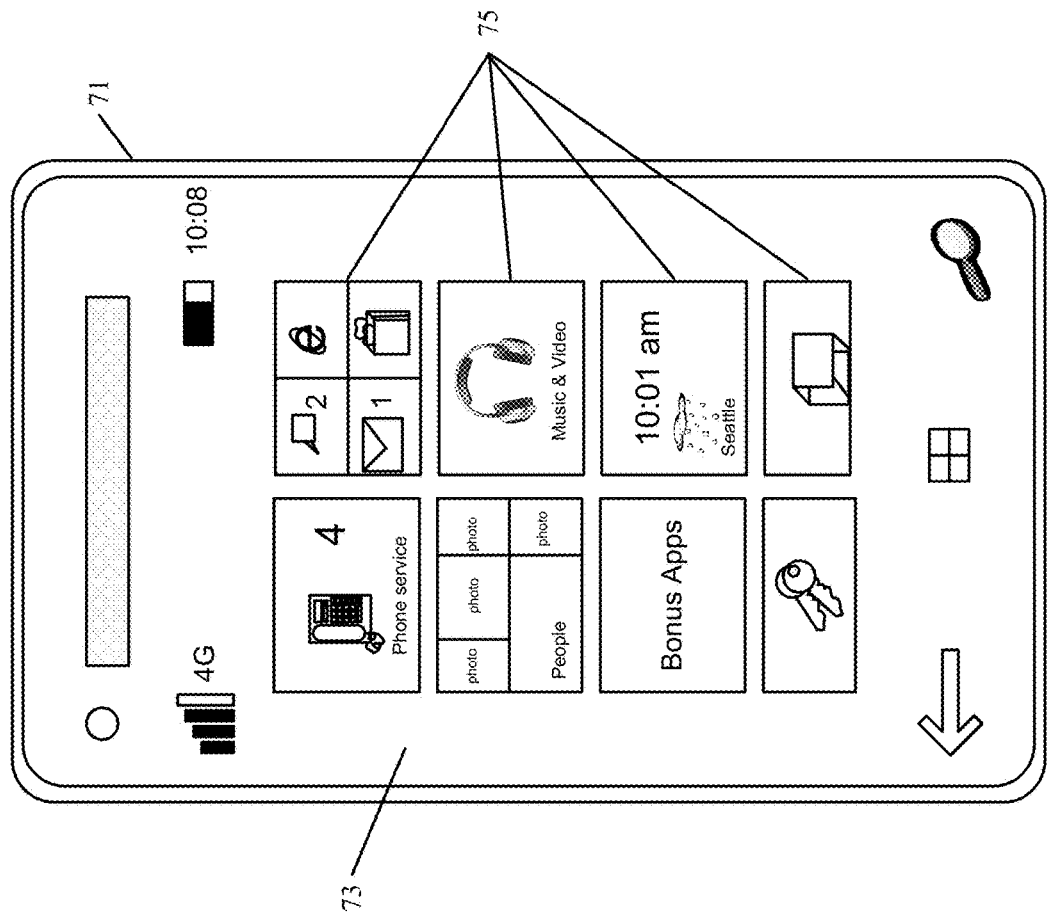
Figure 13:
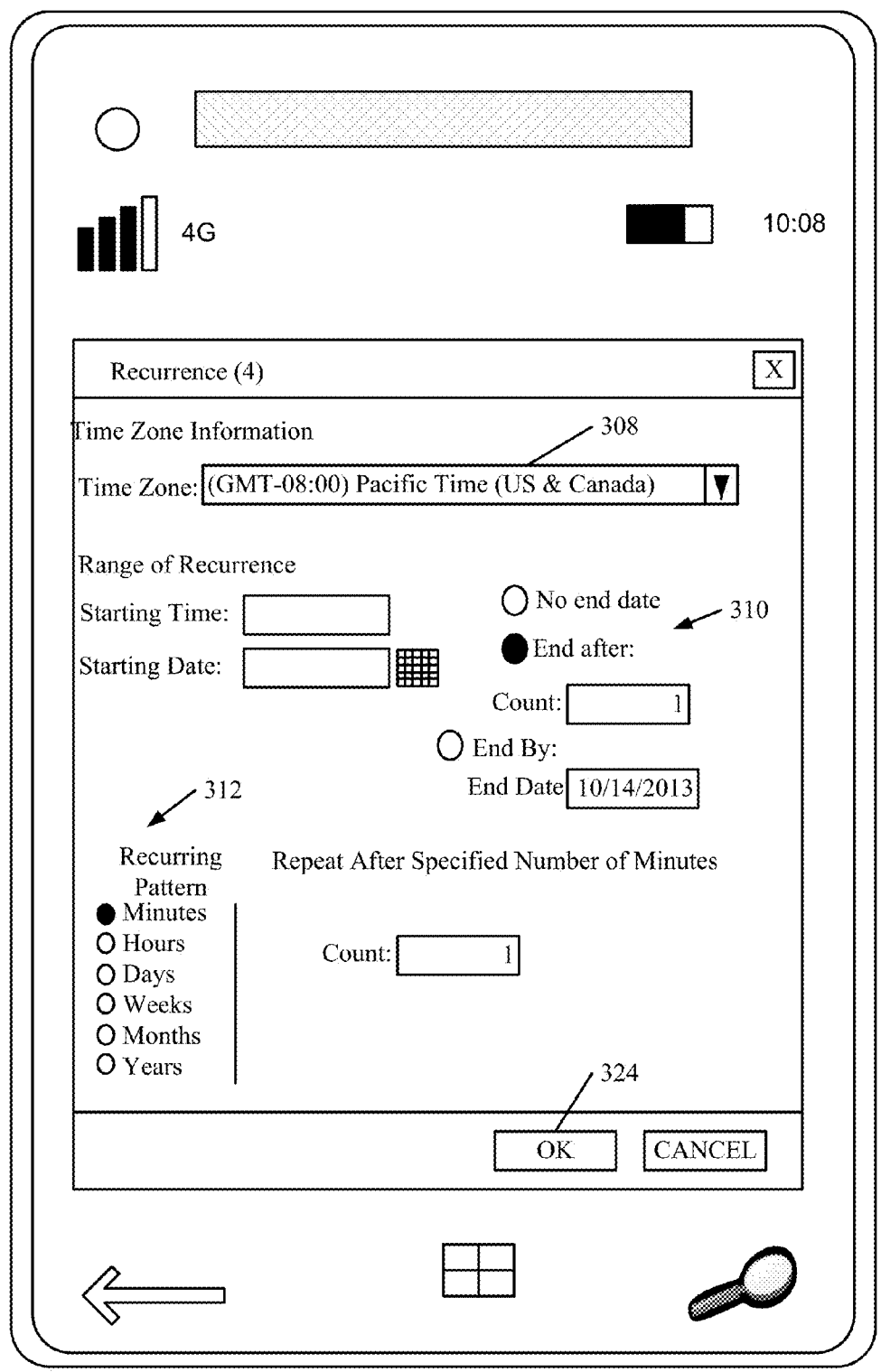

FIG. 12 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 13 shows phone 71 with the display of FIG. 3F displayed thereon.

Note that other forms of the devices 16 are possible.

Figure 14:
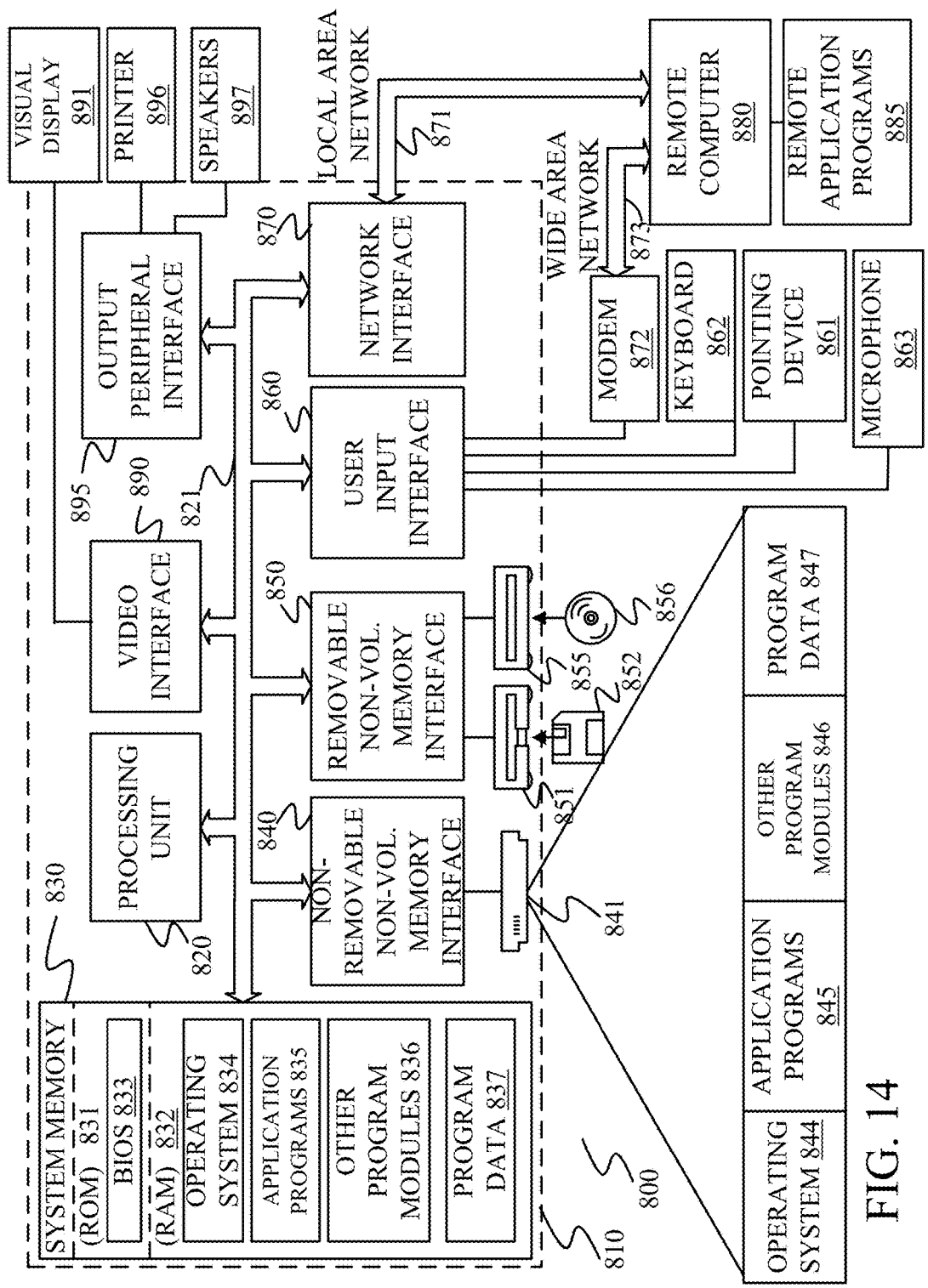
FIG. 14 is a block diagram of one illustrative computing environment.

FIG. 14 is one embodiment of a computing environment in which architecture 100, or parts of it, (for example) can be deployed. With reference to FIG. 14, an exemplary system for implementing some embodiments includes a general-purpose computing device in the form of a computer 810. Components of computer 810 may include, but are not limited to, a processing unit 820 (which can comprise processor 124, 140, 158 or 170), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 14 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
generating, at a first computer system instance, a representation of an entity identification user interface display with an entity identifying user input mechanism;
based on an indication of user actuation of the entity identifying user input mechanism, identifying an entity, in the first computer system instance, to be synchronized with a second computer system instance that is separate from the first computer system instance;
identifying a data schema used on the first computer system instance to store and access data of the identified entity;
sending, to a data synchronization system that synchronizes data between the first and second computer system instances, an entity identifier indicative of the identified entity and an indication of the data schema;
using a computer processor to track a change to the data of the identified entity on the first computer system instance;
generating first synchronization data indicative of the tracked change to the data of the identified entity;
sending the first synchronization data to the data synchronization system;
receiving second synchronization data from the data synchronization system, indicative of a change made to the identified entity in the second computer system instance;
identifying a conflict in the second synchronization data received from the data synchronization system;
accessing a conflict resolution rule;
automatically resolving the identified conflict based on the conflict resolution rule; and
based on the automatic resolution of the identified conflict in the second synchronization data, updating the identified entity in a data store associated with the first computer system instance.

2. The computer-implemented method of claim 1 wherein the first computer system instance, the second computer system instance, and the data synchronization system are remote from one another and communicate over a communication network.

3. The computer-implemented method of claim 1, and further comprising:
identifying a plurality of conflicts in the second synchronization data received from the data synchronization system, and wherein performing conflict resolution further comprises:
generating a representation of a user interface display that indicates an unresolved conflict that is not automatically resolved and includes a conflict resolution user input mechanism; and
based on an indication of user actuation of the conflict resolution user input mechanism, resolving the unresolved conflict.

4. The computer-implemented method of claim 1 and further comprising:
updating the identified entity, with the second synchronization data received from the data synchronization system, in a data store associated with the first computer system instance.

5. The computer-implemented method of claim 4 wherein updating comprises:
based on the second synchronization data received from the data synchronization system, updating a plurality of different tables in the data store, the plurality of different tables storing data corresponding to the identified entity.

6. The computer-implemented method of claim 4 and further comprising:
generating a representation of a provisioning user interface display at the first computer system instance, the provisioning user interface display comprising a provisioning user input mechanism; and
based on an indication of user actuation of the provisioning user input mechanism, identifying the data synchronization system used by the first computer system instance.

7. The computer-implemented method of claim 4 and further comprising:
generating a representation of a synchronization management user input display with a synchronization management user input mechanism; and
based on an indication of user actuation of the synchronization management user input mechanism, configuring a management parameter for synchronizing the identified entity.

8. The computer-implemented method of claim 7 wherein configuring the management parameter comprises configuring whether synchronization is initiated manually or automatically, and, if automatically, start and end times for the synchronization and a recurrence pattern for the synchronization.

9. A computer-implemented method, comprising:
receiving at a synchronization system, from a first computer system instance, a first set of entity identifiers indicative of a first set of entities to be synchronized between the first computer system instance and a second computer system instance;
receiving a schema corresponding to each of the entities in the first set of entities received from the first computer system instance;
receiving a schema corresponding to each of the entities in the second set of entities received from the second computer system instance;
for each given entity that is in both the first and second sets of entities, storing a superset of the schemas corresponding to the given entity at the synchronization system;
identifying changes made to the entities in the first set of entities by the second computer system instance;
sending first synchronization data to the first computer system instance, according to the schemas from the first computer system instance, indicative of the identified changes to the first set of entities made by the second computer system instance;
identifying changes made to the entities in the second set of entities by the first computer system instance; and
sending second synchronization data to the second computer system instance, according to the schemas from the second computer system instance, indicative of the identified changes to the second set of entities made by the first computer system instance.

10. The computer-implemented method of claim 9 wherein the first computer system instance, the second computer system instance, and the data synchronization system are remote from one another and communicate over a network.

11. The computer-implemented method of claim 9 wherein identifying changes made to the entities in the first set of entities comprises:
 receiving, from the second computer system instance, data corresponding to a given entity in the first set of entities;
 comparing the received data to data for the given entity stored at the synchronization system to identify the changes.

12. The computer-implemented method of claim 11 and further comprising:
 identifying, at the synchronization system, conflicts in the given entity based on the comparison.

13. A computing system comprising:
 a processor; and
 memory storing instructions executable by the processor, wherein the instructions configure the computing system to:
 generate, at a first computer system instance, a representation of an entity identification user interface display with an entity identifying user input mechanism;
 based on an indication of user actuation of the entity identifying user input mechanism, identify an entity to be synchronized with a second computer system instance;
 send, to a data synchronization system, an entity identifier indicative of the identified entity;
 send, to the data synchronization system, a data schema used on the first computer system instance to store and access data of the identified entity;
 track a change to the identified entity on the first computer system instance;
 generate first synchronization data indicative of the tracked change to the identified entity;
 send the first synchronization data to the data synchronization system;
 receive second synchronization data from the data synchronization system, indicative of a change made to the identified entity in the second computer system instance;
 identify a conflict in the second synchronization data received from the data synchronization system;
 access a conflict resolution rule;
 automatically resolve the identified conflict based on the conflict resolution rule; and
 based on the automatic resolution of the identified conflict in the second synchronization data, update the identified entity in a computer system data store for the first computer system instance.

14. The computing system of claim 13 wherein the instructions configure the computing system to:
 update a plurality of different tables in the computer system data store corresponding to the entity, with the second synchronization data received from the data synchronization system.

15. The computing system of claim 13 wherein the first computer system instance, the second computer system instance, and the data synchronization system are remote from one another and communicate over a communication network.

* * * * *